(12) United States Patent
Hoshino et al.

(10) Patent No.: US 7,558,972 B2
(45) Date of Patent: Jul. 7, 2009

(54) DATA PROCESSING APPARATUS

(75) Inventors: Masashi Hoshino, Fukuoka (JP);
Masahiro Ohashi, Kasuya-Gun (JP)

(73) Assignee: Panasonic Corporation, Osaka (JP)

( * ) Notice: Subject to any disclaimer, the term of this patent is extended or adjusted under 35 U.S.C. 154(b) by 544 days.

(21) Appl. No.: 11/337,591

(22) Filed: Jan. 24, 2006

(65) Prior Publication Data
US 2006/0190514 A1    Aug. 24, 2006

(30) Foreign Application Priority Data
Jan. 25, 2005  (JP) ............................. 2005-016454

(51) Int. Cl.
*G06F 1/00* (2006.01)
*G06F 7/38* (2006.01)

(52) U.S. Cl. ..................... 713/300; 708/233
(58) Field of Classification Search ................. 713/300; 708/233

See application file for complete search history.

(56) References Cited

U.S. PATENT DOCUMENTS 5,594,679 A * 1/1997 Iwata ........................ 708/521
5,918,042 A * 6/1999 Furber ....................... 713/600
6,651,176 B1 * 11/2003 Soltis et al. ................. 713/300
7,076,682 B2 * 7/2006 Jacobson .................... 713/600
7,107,471 B2 * 9/2006 Feierbach ................... 713/324
2004/0243875 A1 * 12/2004 Dalvi ......................... 713/501

FOREIGN PATENT DOCUMENTS

| JP | 6-292178 | 10/1994 |
|---|---|---|
| JP | 10-334225 | 12/1998 |
| JP | 11-149373 | 6/1999 |

* cited by examiner

*Primary Examiner*—Mark Connolly
*Assistant Examiner*—Stefan Stoynov
(74) *Attorney, Agent, or Firm*—Wenderoth, Lind & Ponack, L.L.P.

(57) ABSTRACT

A data processing apparatus comprises a plurality of calculating units connected each other in series, a plurality of memories connected in between the plurality of calculating units, and a control unit operable to determine a calculating unit, which performs calculation in a unit cycle, among the plurality of the calculating units. It is possible to reduce unnecessary power consumption in the data processing apparatus while completing processing in permissible processing time set by an application.

2 Claims, 17 Drawing Sheets

DATA PROCESSING APPARATUS

BACKGROUND OF THE INVENTION

1. Field of the Invention

The present invention relates to a technology to reduce power consumption in a data processing apparatus which mainly operates in a manner of pipeline processing.

2. Description of the Related Art

Demand for improvement in processing speed is increasing every year in a data processing apparatus that performs picture processing and audio processing.

A pipeline processor which a plurality of calculating units are connected in series to perform parallel processing realizes the improvement in processing speed.

Document 1 (published Japanese Patent Application Laid-Open No. HEI10-334225) discloses a data processing apparatus comprising a plurality of calculating units connected in series and a plurality of memories which connect each of the calculating units. Each memory consists of a double buffer.

FIG. 17 is a block diagram illustrating the data processing apparatus disclosed in Document 1.

A data processing apparatus 200 has four calculating units 201 to 204 and three memories 205 to 207 which connect these four calculating units. The calculating units 201 to 204 are connected in series, and perform predetermined calculation for the inputted data therein. Each of the memories 205 to 207 is structured by a double buffer, and stores data outputted from a calculating unit at the previous stage thereof and, at the same time, outputs data previously stored therein to a calculating unit at the following stage thereof.

For example, the memory 205 stores output data of the calculating unit 201 and outputs the previously stored data to the calculating unit 202.

The data inputted into the calculating unit 201 is first calculated by the calculating unit 201, and the calculating unit 202 at the following stage receives a calculation result. The calculating unit 202 performs calculation based on the received calculation result, and passes a calculation result to the calculating unit 203 at the following stage via the memory 206. The calculating unit 201 performs calculation to the subsequent input data while the calculating unit 202 performs the predetermined calculation. That is, the calculating units 201 to 204 operate in parallel.

As described above, pipeline processing is realized by series connection of the calculating units 201 to 204 via the memories 205 to 207 therebetween.

However, even when dealing with an application which does not need high processing capability, the data processing apparatus in the prior art performs pipeline processing, activating all the calculating units in the same period. Therefore, the data processing apparatus in the prior art performs pipeline calculation corresponding to the maximum required capability thereof.

For this reason, a problem arises that unnecessary power is often consumed, in excess of the requirement of the application. The problem results in insufficient reduction of power consumption, specifically unfavorable increase of a peak power.

On the other hand, in picture processing and audio processing, even when the picture processing and audio processing are performed according to the same standard, required processing capability differs in many cases, depending on the required picture size or audio quality (for example, a CIF picture and a QCIF picture).

Therefore, there arises another problem that calculation processing responding to changes of the required processing capability can not be practiced during processing of the same application. This problem results in wasteful power consumption.

SUMMARY OF THE INVENTION

In view of the above, an object of the present invention is to provide a data processing apparatus realizing pipeline processing that necessitates power consumption in response to changes of the required processing capability, thereby reducing power consumption.

A first aspect of the present invention provides a data processing apparatus comprising: a plurality of calculating units connected each other in series, each of the plurality of calculating units being operable to perform individually allotted calculation in a unit cycle; a plurality of memory units connected between the plurality of calculating units, in such a manner that each of the plurality of memory units and each of the plurality of calculating units are connected alternately; and a control unit operable to select a calculating unit to perform the individually allotted calculation in a certain unit cycle, among the plurality of calculating units.

According to the present structure, it is possible to provide a calculating unit which does not need calculation in a unit cycle, thereby; unnecessary power consumption can be reduced.

A second aspect of the present invention provides a data processing apparatus as defined in the first aspect, wherein a period of the unit cycle is decided according to a longest processing period required for each of the plurality of calculating units to perform the individually allotted calculation.

According to the present structure, all of the plurality of calculating units complete their processing in the unit cycle, thereby; pipeline processing can be realized.

A third aspect of the present invention provides a data processing apparatus as defined in the first aspect, wherein the control unit decides a number of calculating units to be selected from the plurality of calculating units, each of the selected calculating units being operable to perform the individually allotted calculation in a certain unit cycle.

According to the present structure, it is possible to provide a calculating unit which does not need calculation in a unit cycle, thereby; unnecessary power consumption, especially, a peak power or power consumption at a certain moment, can be reduced.

A fourth aspect of the present invention provides a data processing apparatus as defined in the first aspect, wherein the control unit selects a calculating unit to perform the individually allotted calculation in a certain unit cycle, among the plurality of calculating units, according to a total of processing time required for each of the plurality of calculating units to perform the individually allotted calculation.

According to the present structure, a control unit can determine a calculating unit which performs calculation in a unit cycle after satisfying a requirement for the entire processing time posed by different applications.

A fifth aspect of the present invention provides a data processing apparatus as defined in first aspect, wherein the control unit selects a calculating unit to perform the individually allotted calculation in a certain unit cycle, among the plurality of calculating units, according to an input interval of data inputted to a first stage calculating unit of the plurality of calculating units.

According to the present structure, a control unit can determine a calculating unit which performs calculation in a unit cycle after admitting an input interval of input data in different applications.

A sixth aspect of the present invention provides a data processing apparatus as defined in the fifth aspect, wherein the control unit decides the input interval according to notified permissible time information about a total of processing time required for each of the plurality of calculating units to perform the individually allotted calculation.

According to the present structure, a control unit can determine a calculating unit which performs calculation in a unit cycle so as to satisfy a requirement according to information from the outside.

A seventh aspect of the present invention provides a data processing apparatus as defined in the first aspect, wherein the control unit is operable to decide a calculating unit not selected by the control unit to perform the individually allotted calculation in a certain unit cycle, among the plurality of calculating units, and wherein the control unit is operable to select one of (1) cutting down a power to be supplied to the determined calculating unit; (2) cutting down a clock signal to be supplied to the determined calculating unit; (3) reducing a frequency of the clock signal to be supplied to the determined calculating unit; and (4) increasing a threshold voltage to be supplied to the determined calculating unit.

According to the present structure, while practicing data processing which satisfies a requirement of an application, power consumption can be reduced for a calculation unit in which calculation is unnecessary in a unit cycle. As a result, assurance of operation capability and reduction of power consumption are kept compatible in the data processing apparatus.

An eighth aspect of the present invention provides a data processing apparatus as defined in the first aspect, wherein each of the plurality of memory units comprises: a first bank operable to store data inputted from a calculating unit of the memory unit, the calculating unit being connected to an input terminal of the memory unit; and a second bank operable to store data outputted to a calculating unit of the memory unit, the calculating unit being connected to an output terminal of the memory unit.

A ninth aspect of the present invention provides a data processing apparatus as defined in the eighth aspect, wherein the control unit is operable to perform one of: (1) cutting down a power to be supplied to one of the first bank and the second bank, in which data updating and/or data outputting is not required in a certain unit cycle; (2) cutting down a clock signal to be supplied to one of the first bank and the second bank, in which data updating and/or data outputting is not required in a certain unit cycle; (3) reducing a frequency of the clock signal to be supplied to one of the first bank and the second bank, in which data updating and/or data outputting is not required in a certain unit cycle; and (4) increasing a threshold voltage to be supplied to one of the first bank and the second bank, in which data updating and/or data outputting is not required in a certain unit cycle.

According to the present structures, power consumption can be reduced for a bank for which data update and/or data output become unnecessary as the result of determining a calculation unit that performs calculation. Thereby, the present structures can perform data processing which satisfies a requirement of an application, while providing reduced power consumption in the data processing apparatus, more specifically, reduced power consumption in the aforementioned bank and in a calculation unit in which calculation becomes unnecessary.

A tenth aspect of the present invention provides a data processing apparatus as defined in the first aspect, wherein the plurality of memory units include a first memory unit and a second memory unit, wherein the plurality of calculating units include a first calculating-unit pair and a second calculating-unit pair, the first calculating-unit pair including a calculating unit connected to an input terminal of the first memory unit and a calculating unit connected to an output terminal of the first memory unit, and the second calculating-unit pair including a calculating unit connected to an input terminal of the second memory unit and a calculating unit connected to an output terminal of the second memory unit, and wherein when the first calculating-unit pair and the second calculating-unit pair are exclusive in operation in a certain unit cycle, the first and second calculating-unit pairs share one of the first memory unit and the second memory unit.

An eleventh aspect of the present invention provides a data processing apparatus as defined in the tenth aspect, wherein, when one of the first memory and the second memory is shared by the first and second calculating-unit pairs, the control unit is operable to perform one of: (1) cutting down a power to be supplied to one of the first memory and the second memory, which is not shared by the first and second calculating-unit pairs; (2) cutting down a clock signal to be supplied to one of the first memory and the second memory, which is not shared by the first and second calculating-unit pairs; (3) reducing a frequency of the clock signal to be supplied to one of the first memory and the second memory, which is not shared by the first and second calculating-unit pairs; and (4) increasing a threshold voltage to be supplied to one of the first memory and the second memory, which is not shared by the first and second calculating-unit pairs.

According to the present structures, a non-used memory can be provided as the result of determining a calculating unit by the control unit. By reducing the power consumption of the non-used memory, the power consumption of the data processing apparatus can be further reduced in addition to the power consumption reduction of a calculating unit in which calculation is unnecessary and a non-used bank.

A twelfth aspect of the present invention provides a semiconductor integrated circuit comprising: a plurality of calculating units connected each other in series, each of the plurality of calculating units being operable to perform individually allotted calculation in a unit cycle; a plurality of memory units connected between the plurality of calculating units, in such a manner that each of the plurality of memory units and each of the plurality of calculating units are connected alternately; and a control unit operable to select a calculating unit to perform the individually allotted calculation in a certain unit cycle, among the plurality of calculating units.

A thirteenth aspect of the present invention provides a semiconductor integrated circuit as defined in the twelfth aspect, wherein the control unit is operable to determine a calculating unit not selected by the control unit to perform the individually allotted calculation in a certain unit cycle, among the plurality of calculating units, and wherein the control unit is operable to select one of: (1) cutting down a power to be supplied to the determined calculating unit; (2) cutting down a clock signal to be supplied to the determined calculating unit; (3) reducing a frequency of the clock signal to be supplied to the determined calculating unit; and (4) increasing a threshold voltage to be supplied to the determined calculating unit.

According to these structures, power consumption of a semiconductor integrated circuit can be reduced, while satisfying a specification of the application.

The above, and other objects, features and advantages of the present invention will become apparent from the following description read in conjunction with the accompanying drawings, in which like reference numerals designate the same elements.

DETAILED DESCRITION OF THE INVENTION

Hereafter, embodiments of the present invention are explained referring to accompanying drawings.

Embodiment 1

Figure 1:
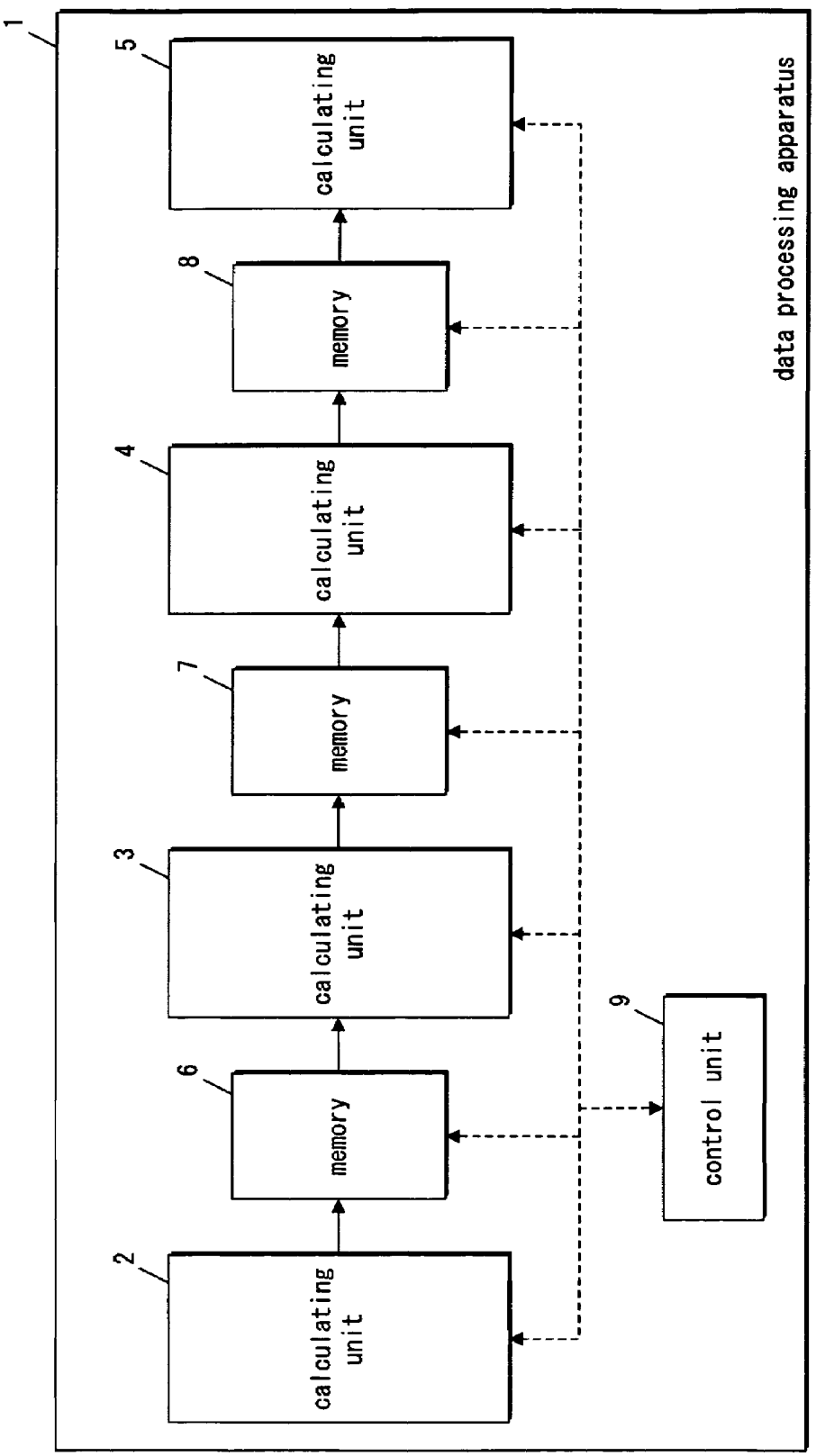
FIG. 1 is a block diagram illustrating a data processing apparatus according to Embodiment 1 of the present invention.

FIG. 1 is a block diagram of a data processing apparatus in Embodiment 1 of the present invention.

First, the construction of the data processing apparatus 1 is explained.

The data processing apparatus 1 comprises a plurality of calculating units 2 to 5, a plurality of memories 6 to 8, and a control unit 9.

The plurality of the calculating units 2 to 5 perform respectively predetermined calculation in a unit cycle, i.e., in a predetermined time interval. The calculating units 2 to 5 are connected in series as shown in FIG. 1. In the data processing apparatus 1, the calculating unit 2 is a calculating unit at a first stage, and the calculating unit 5 is a calculating unit at a last stage.

In the data processing apparatus 1 shown in FIG. 1, to data inputted therein, the calculating units 2 to 5 perform individually allotted calculation, completing all of the calculation up to the calculating unit 5 at the last stage. In other words, the calculating units 2 to 5 perform one set of the calculation processing.

The plurality of memories 6 to 8 correspond to a plurality of memory units.

The plurality of memories 6 to 8 are connected between the calculating units 2 to 5, in such a manner that each of the plurality of memories 6 to 8 and each of the calculating units 2 to 5 are connected alternately. Each of the memories 6 to 8 hands over data from the upper stage calculating unit to the down stage calculating unit thereof.

More specifically, the memory 6 is connected in between the calculating unit 2 and the calculating unit 3, stores the calculation result of the calculating unit 2, and outputs the stored calculation result to the calculating unit 3. The memory 7 is connected in between the calculating unit 3 and the calculating unit 4, stores the calculation result of the calculating unit 3, and outputs the stored calculation result to the calculating unit 4. The memory 8 is connected in between the calculating unit 4 and the calculating unit 5, stores the calculation result of the calculating unit 4, and outputs the stored calculation result to the calculating unit 5.

The control unit 9 determines a calculating unit which performs calculation in a unit cycle out of the plurality of calculating units 2 to 5. In other words, the control unit 9 determines the number of the calculating units that perform calculation in the unit cycle. When determining a calculating unit that performs calculation, the control unit 9 considers the entire processing time required for the entire processing that is performed by the plurality of calculating units 2 to 5. Alternatively, the control unit 9 considers the input interval of data to be inputted into the data processing apparatus 1.

The control unit 9 also controls the power consumption of a calculating unit which does not perform calculation in the entire processing.

Figure 2:
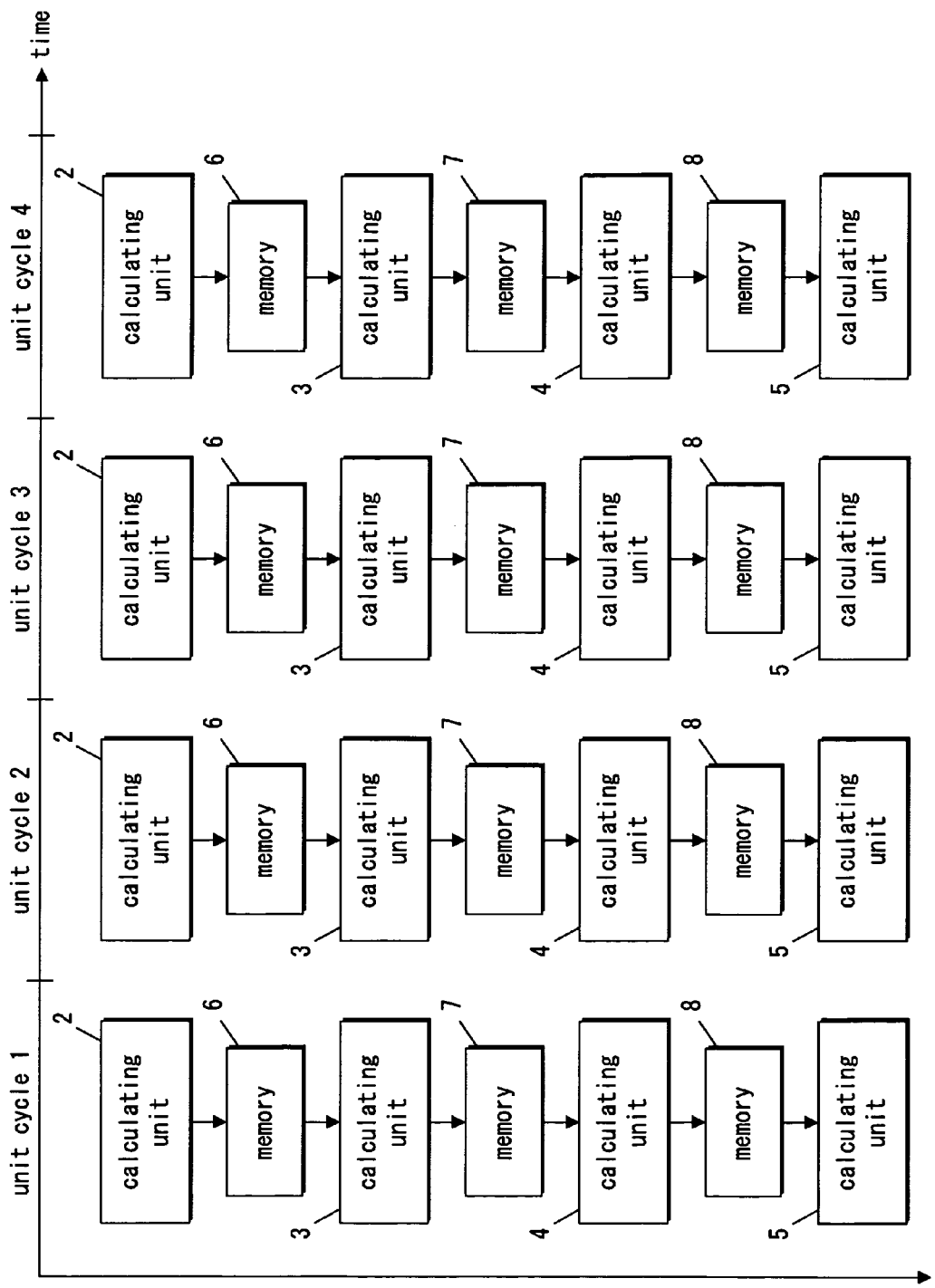
FIG. 2 is a diagram explaining operation of the data processing apparatus according to Embodiment 1 of the present invention.
Figure 3:
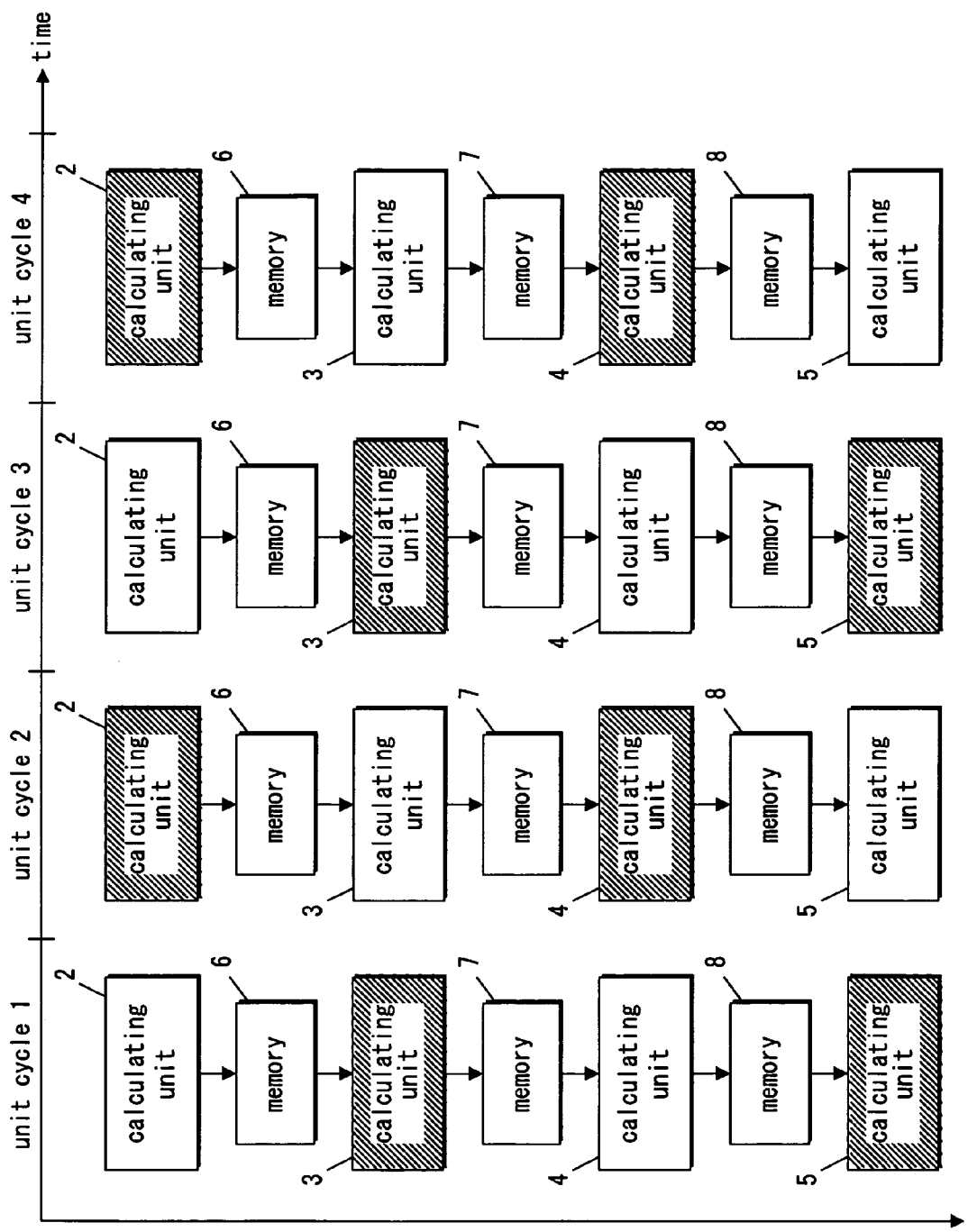
FIG. 3 is a diagram explaining operation of the data processing apparatus according to Embodiment 1 of the present invention.
Figure 4:
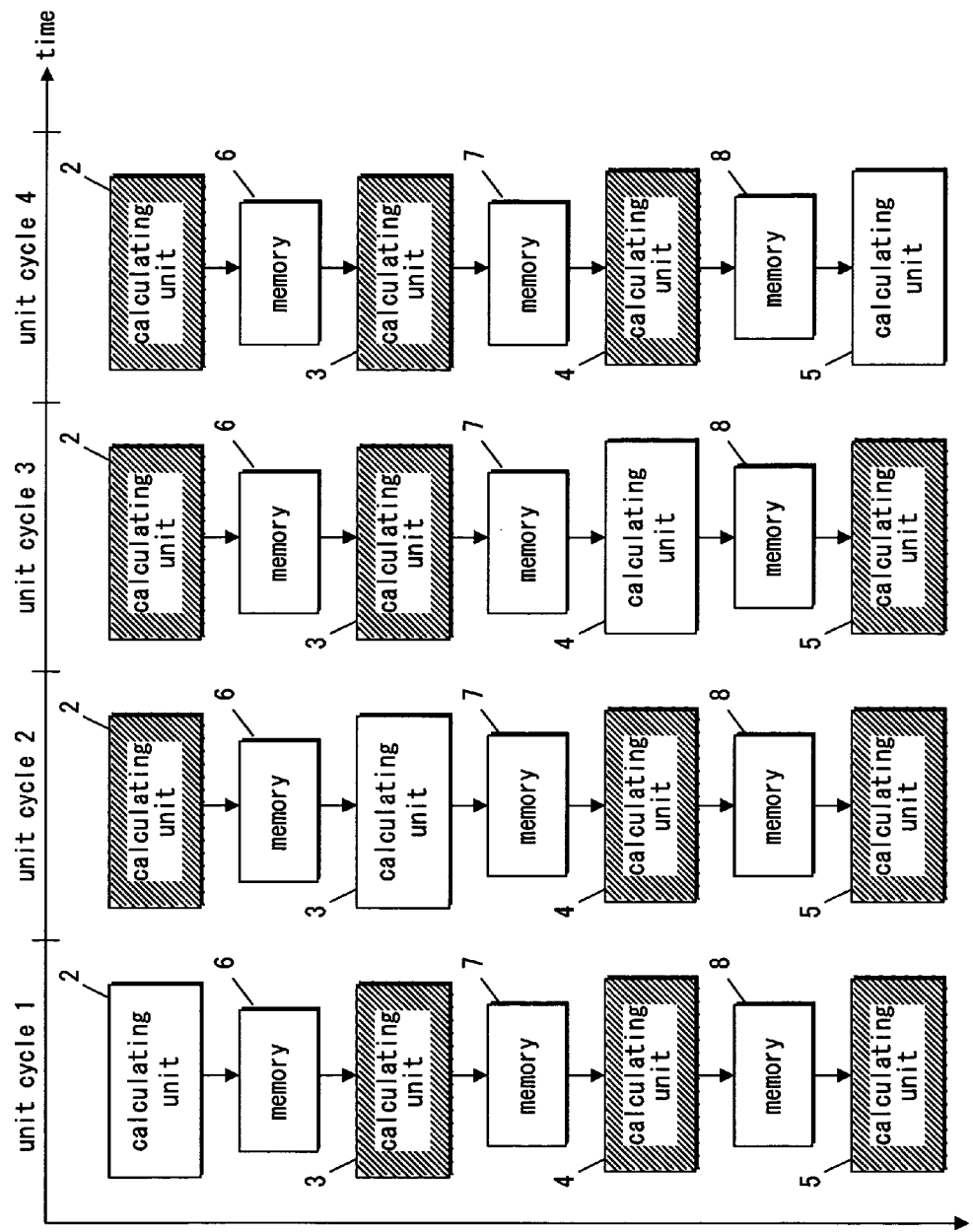
FIG. 4 is a diagram explaining operation of the data processing apparatus according to Embodiment 1 of the present invention.

Next, the operation of the data processing apparatus 1 is explained referring to FIG. 2 to FIG. 4.

FIG. 2, FIG. 3, and FIG. 4 are diagrams explaining operation of the data processing apparatus in Embodiment 1 of the present invention.

In FIG. 2, FIG. 3, and FIG. 4, a horizontal axis indicates a time axis and a vertical axis indicates a connection direction of the calculating units. The unit cycle is defined by a predetermined time interval. The unit cycle may be defined arbitrarily; however, it is more suitable to define the unit cycle based on a maximum processing time among the respective processing times of the calculating units 2 to 5. This is because the entire calculation in all the calculating units completes within thus-defined unit cycle.

Data inputted to the calculating unit 2 in a certain time is processed by the calculating unit 2 in a unit cycle 1, subsequently by the calculating unit 3 in a unit cycle 2, further subsequently by the calculating unit 4 in a unit cycle 3, and finally by the calculating unit 5 in a unit cycle 4, thereby the processed result is outputted as output data.

In FIG. 2, operation is shown for a case where the required speed in the entire processing time is at the maximum. In other words, the input data enters the calculating unit 2 or a calculating unit at the first stage of the data processing apparatus 1, for every unit cycle.

In FIG. 2, first input data enters the calculating unit 2 in the unit cycle 1. Second input data enters the calculating unit 2 in the unit cycle 2. Third input data enters the calculating unit 2 in the unit cycle 3. Fourth input data enters the calculating unit 2 in the unit cycle 4. The first to fourth input data are processed while moving from the calculating unit 2 up to the calculating unit 5 for every unit cycle.

In the unit cycle 1, the calculating unit 2 performs calculation using the first input data, and outputs the calculation result to the memory 6. The other calculating units 3 to 5 perform their respective calculation using input data that have entered prior to the first input data.

In the unit cycle 2, the calculating unit 2 performs calculation using the second input data. Simultaneously, the calculating unit 3 performs calculation using the calculation result stored in the memory 6, and outputs the calculation result to the memory 7.

In the unit cycle 3, the calculating unit 2 performs calculation using the third input data, and outputs the calculation result to the memory 6. The following two pieces of processing are simultaneously performed: the calculating unit 3 performs calculation using the calculation result stored in the memory 6, and the calculating unit 4 performs calculation using the calculation result stored in the memory 7.

In the unit cycle 4, the calculating unit 2 performs calculation using the fourth input data, and outputs the calculation result to the memory 6. The following three pieces of processing are simultaneously performed: the calculating unit 3 performs calculation using the calculation result stored in the memory 6; the calculating unit 4 performs calculation using the calculation result stored in the memory 7; and the calculating unit 5 performs calculation using the calculation result stored in the memory 8.

By the above-mentioned operation, in the unit cycle 4, the calculation up to the third data has completed and the calculation to the fourth input data has started in the calculating unit 2.

In other words, when the required speed is at the maximum, all of the four calculating units 2 to 5 perform their respective calculation in each unit cycle. Naturally speaking, the memories 6 to 8 are also in operation, since all of the calculating units are in operation.

In this case, the control unit 9 determines all of the calculating units 2 to 5 as the calculating units that perform calculation in every unit cycles.

Thus, in the case shown in FIG. 2, the power consumption of the data processing apparatus 1 is at the maximum, as well as the processing speed.

Next, in FIG. 3, operation is shown for a case where the required speed in the entire processing time is intermediate. In this case, the input data enters the calculating unit 2 for every 2 unit cycles.

Since the input data enters the calculating unit 2 for every 2 unit cycles, the control unit 9 determines two calculating units out of the four calculating units 2 to 5 as calculating units that perform calculation in a unit cycle.

In FIG. 3, a calculating unit shown by a shaded box with slanted lines therein is a calculating unit that does not perform calculation in the concerned unit cycle. A calculating unit shown by a shaded box with slanted lines therein is called as a shaded calculating unit hereafter.

In the unit cycle 1, only the calculating unit 2 and the calculating unit 4 perform calculation. In the unit cycle 2, only the calculating unit 3 and the calculating unit 5 perform calculation. In the unit cycle 3, only the calculating unit 2 and the calculating unit 4 perform calculation. In the unit cycle 4, only the calculating unit 3 and the calculating unit 5 perform calculation.

By the above-mentioned operation, in the unit cycle 4, processing for up to the second input data has started. In other words, comparing the present case to the case shown in FIG. 2, the data processing apparatus 1 completes the calculation processing for half the data amount. However, the power of the shaded calculating units, which do not perform calculation, is reduced. Thus, in the case shown in FIG. 3, the power consumption of the data processing apparatus 1 can be reduced.

Especially, when the power supply is cut for the calculating units which are not performing calculation, the power consumption necessary in the unit cycle is reduced to a half approximately, since the power consumption of these calculating units approaches zero.

Next, in FIG. 4, operation is shown for a case where the required speed in the entire processing time is low. In this case, the input data enters the calculating unit 2 for every 4 unit cycles.

Since the input data enters the calculating unit 2 for every 4 unit cycles, the control unit 9 determines one calculating unit out of the four calculating units 2 to 5 as a calculating unit which performs calculation in the unit cycle.

In FIG. 4, the shaded calculating unit is a calculating unit which does not perform calculation in the concerned unit cycle.

In the unit cycle 1, only the calculating unit 2 performs calculation and outputs the calculation result to the memory 6. In the unit cycle 2, using the calculation result stored in the memory 6, only the calculating unit 3 performs calculation and outputs the calculation result to the memory 7. In the unit cycle 3, using the calculation result stored in the memory 7, only the calculating unit 4 performs calculation and outputs the calculation result to the memory 8. In the unit cycle 4, using the calculation result stored in the memory 8, only the calculating unit 5 performs the calculation.

By the above-mentioned operation, in the unit cycle 4, the calculation for the first input data is completed. In other words, comparing the present case to the case shown in FIG. 2, the data processing apparatus 1 completes the calculation processing for one fourth the data amount. However, the power of the shaded calculating units, which do not perform calculation, is reduced.

Especially, when the power supply is cut for the calculating units which are not performing calculation, the power consumption necessary in the unit cycle is reduced to a quarter approximately, since the power consumption of these calculating units approaches zero. In other words, the peak power becomes a quarter of the full power.

Here, power consumption reduction in the shaded calculating units shown FIG. 3 and FIG. 4, which are not performing calculation, is explained.

The control unit 9 cuts the power supply to the calculating units that do not perform calculation in a unit cycle (the shaded calculating units in FIG. 3 and FIG. 4). The power consumption is most effectively reduced by cutting the power supply to the calculating units that do not need to perform calculation.

Cutting the power supply can be readily realized by opening a switch that is set up in a path of a power line to a calculating unit.

Alternatively, the control unit 9 may reduce the frequency of a clock signal supplied to a calculating unit that does not perform calculation. This is also preferable for the power consumption reduction. The power consumption of the electronic circuit constituting the calculating units generally increases in proportion to the frequency of the clock signal. Therefore, reduction of the frequency of the clock signal leads to reduction of the power consumption in the data processing apparatus 1.

Instead of reducing the frequency of the clock signal, the control unit 9 may, more directly, cut down the clock signal supplied to a calculating unit that does not need to perform calculation.

As further alternative to reduce the power consumption, it is preferable that the control unit 9 increases a threshold voltage of a calculating unit that does not perform calculation.

When the threshold voltage is increased, a voltage difference between a source and a drain of a MOS transistor constituting the calculating unit decreases, resulting in decrease of a leak current of the MOS transistor. As a consequence, the power consumption of the calculating unit which does not need to perform calculation is can be reduced.

By the above-mentioned control by the control unit 9, when high-speed calculation is unnecessary, the power consumption of the data processing apparatus 1 can be reduced. As a result, the calculation processing with the appropriate balance between the entire processing time and the power consumption required to the data processing apparatus 1 can be realized.

Figure 5:
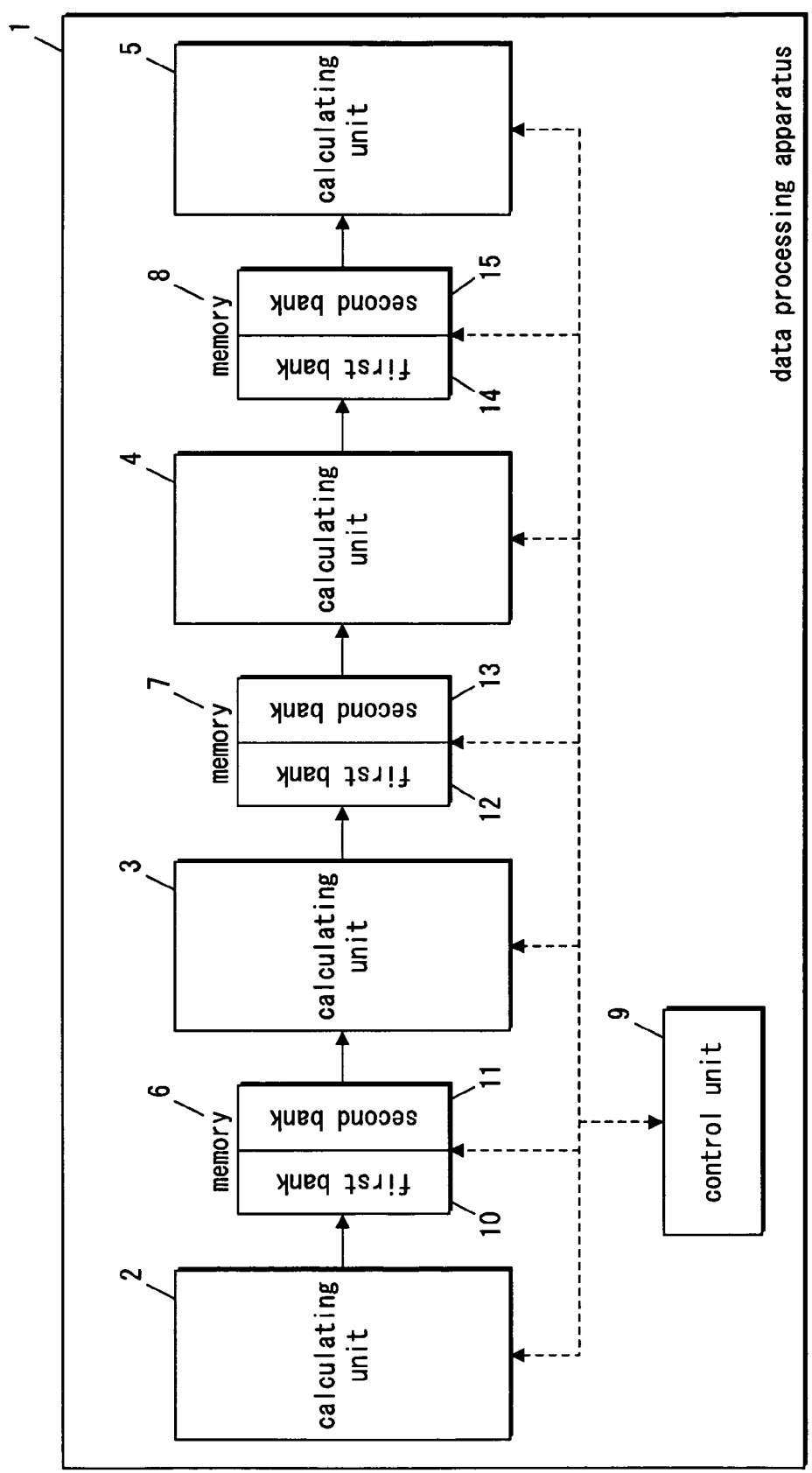
FIG. 5 is a block diagram illustrating the data processing apparatus according to Embodiment 1 of the present invention.
Figure 6:
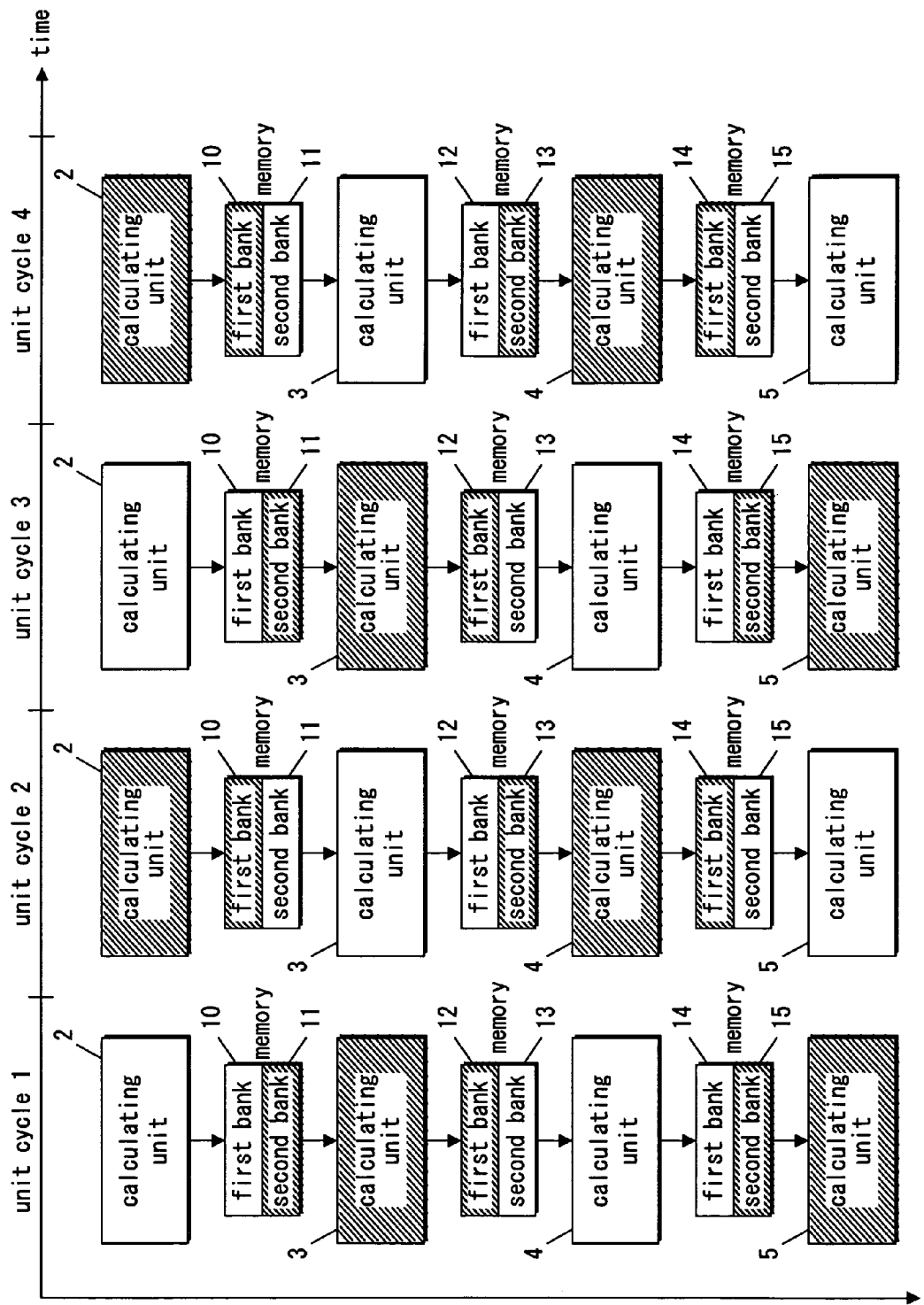
FIG. 6 is a diagram explaining operation of the data processing apparatus according to Embodiment 1 of the present invention.
Figure 7:
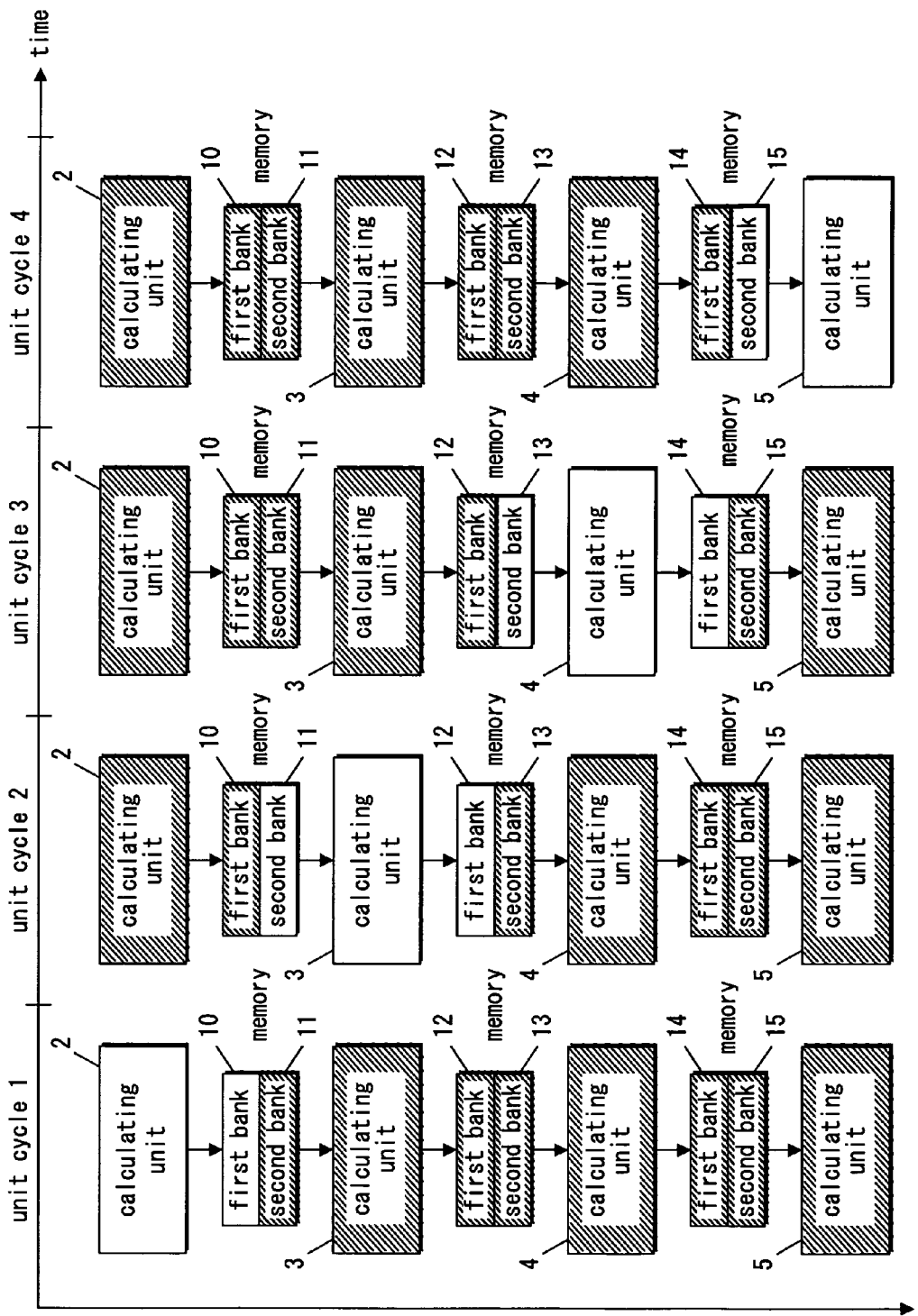
FIG. 7 is a diagram explaining operation of the data processing apparatus according to Embodiment 1 of the present invention.

Next, referring to FIG. 5 to FIG. 7, the following explains the power consumption reduction in a memory that does not require data update, in addition to a calculating unit that does not require calculation.

FIG. 5 is a block diagram of a data processing apparatus in Embodiment 1 of the present invention.

In FIG. 5, the memories 6 to 8 include respectively a plurality of banks, comprising a first bank operable to store data from a calculating unit at the previous stage thereof and a second bank operable to store data to be outputted to a calculating unit at the following stage thereof.

A first bank 10 stores the calculation result of the calculating unit 2. A second bank 11 stores data to be outputted to the calculating unit 3.

A first bank 12 stores the calculation result of the calculating unit 3. A second bank 13 stores data to be outputted to the calculating unit 4.

A first bank 14 stores the calculation result of the calculating unit 4. A second bank 15 stores data to be outputted to the calculating unit 5.

In a case where the required speed in the data processing apparatus is at the maximum, all of the memories 6 to 8 need to update data in every unit cycles, since all of the calculating units 2 to 5 perform calculation in every unit cycles.

On the other hand, when the required speed in the data processing apparatus 1 is intermediate, two calculating units perform calculation out of the four calculating units 2 to 5 in a unit cycle, as explained in FIG. 3. Thus, there is a bank that does not require data update or data output, among the banks in a memory adjoining a calculating unit that does not perform calculation.

Birth of a bank which does not require data update or data output, is explained using FIG. 6 and FIG. 7.

FIG. 6 and FIG. 7 are diagrams explaining operation of a data processing apparatus in Embodiment 1 of the present invention.

FIG. 6, as well as FIG. 3, shows a case where input data enters the calculating unit 2 for every 2 unit cycles.

In the unit cycle 1, since the calculating units 3 and 5 do not need to perform calculation, the second bank 11 and the first bank 12, both adjoining to the calculating unit 3, and the second bank 15 adjoining to the calculating unit 5, do not need to perform data update or data output.

By the same reason, in the unit cycle 2, the first bank 10, the second bank 13, and the first bank 14 do not need to perform data update or data output. In the unit cycle 3, the second bank 11, the first bank 12, and the second bank 15 do not need to perform data update or data output. In the unit cycle 4, the first bank 10, the second bank 13, and the first bank 14 do not need to perform data update or data output.

Banks, which do not need to perform data update or data output, are regarded as targets for the power consumption reduction, as well as calculating units which do not need to perform calculation. In the case shown in FIG. 6 where the memories 6 to 8 are not divided into banks, even when the calculating unit 3 does not need to perform calculation in the unit cycle 1, the memory 6 and the memory 7 need to perform update, since the calculating unit 2 and the calculating unit 4 perform calculation. Thus, a memory can not be regarded as targets for the power consumption reduction. However, by dividing the memories into a plurality of banks, banks adjoining to a calculating unit which does not need to perform calculation, can be regarded as targets for the power consumption reduction.

The control unit 9 cuts the power supply to a bank that does not need to perform data update or data output. By cutting the power supply, the power consumption in the bank can be effectively reduced. Especially, peak power or power at a moment in the data processing apparatus 1 can be reduced.

Alternatively, the control unit 9 may reduce the frequency of a clock signal supplied to a bank that does not perform data update or data output, or may cut down the clock signal. As a result, the power consumption can be reduced by reducing the frequency of the clock signal or cutting down the clock signal.

As further alternative, it is preferable for the control unit 9 to increase a threshold voltage of a bank that does not perform data update or data output. As a result, a leak current decreases by increasing the threshold voltage. Thus, the power consumption can be reduced.

The control unit 9 either cuts the power supply, stops the clock signal, reduces the frequency, or increases the threshold voltage for both of the shaded calculating units and banks shown in FIG. 6, thereby reducing the power consumption in the data processing apparatus 1. In addition, power reducing processing performed by the control unit 9 may be one item or more, preferably combining a plurality of items described above. As a result, the power consumption of the data processing apparatus 1 can be more effectively reduced.

The same processing for the power consumption reduction can be adopted in a case when input data enters for every 4 unit cycles as shown in FIG. 7. The shaded calculating units and banks are regarded as targets for the power consumption reduction.

In FIG. 7, more calculating units and banks become out of performance in a unit cycle. Thus, the power consumption can be reduced.

In addition, the control unit 9 determines a calculating unit that performs calculation among the plurality of calculating units, based on the entire processing time required by the data processing apparatus 1 and the input interval of input data to be inputted into a calculating unit at the first stage thereof. Furthermore, the control unit 9 determines a calculating unit that performs calculation among the plurality of calculating units, according to externally-notified permissible time information indicative of a permissible time in calculation processing. For example, when the data processing apparatus 1 is mounted in an application which performs picture compressing, the permissible time information is generated based on information relating to change of picture size and reproduction speed, and notified to the data processing apparatus 1. The control unit 9 determines the input interval of input data based on the permissible time information, and determines a calculating unit that performs calculation among the plurality of calculating units based on the determined input interval.

As mentioned above, by determining a calculating unit that performs calculation out of the plurality of calculating units according to the required speed and the input interval of input data, a calculating unit that does not need to perform calculation, and a bank that does not need to perform data update or data output, can be made as targets for the power consumption reduction. The power consumption in the calculating unit that does not need to perform calculation, and the bank that does not need to perform data update or data output, can be reduced.

As a result, the processing time in balance to the required speed and the power consumption reduction can be simultaneously realized.

Embodiment 2

Next, Embodiment 2 is explained. The data processing apparatus comprising the calculating unit used for various purposes is explained in Embodiment 1. In Embodiment 2, an example that the data processing apparatus performs picture processing to a picture including M*N pixels (M and N are integers equal to 1 or more) is explained. Moreover, each of the plurality of calculating units included in the data processing apparatus performs calculation that corresponds to each of the plurality of processing units included in the picture processing.

Figure 8:
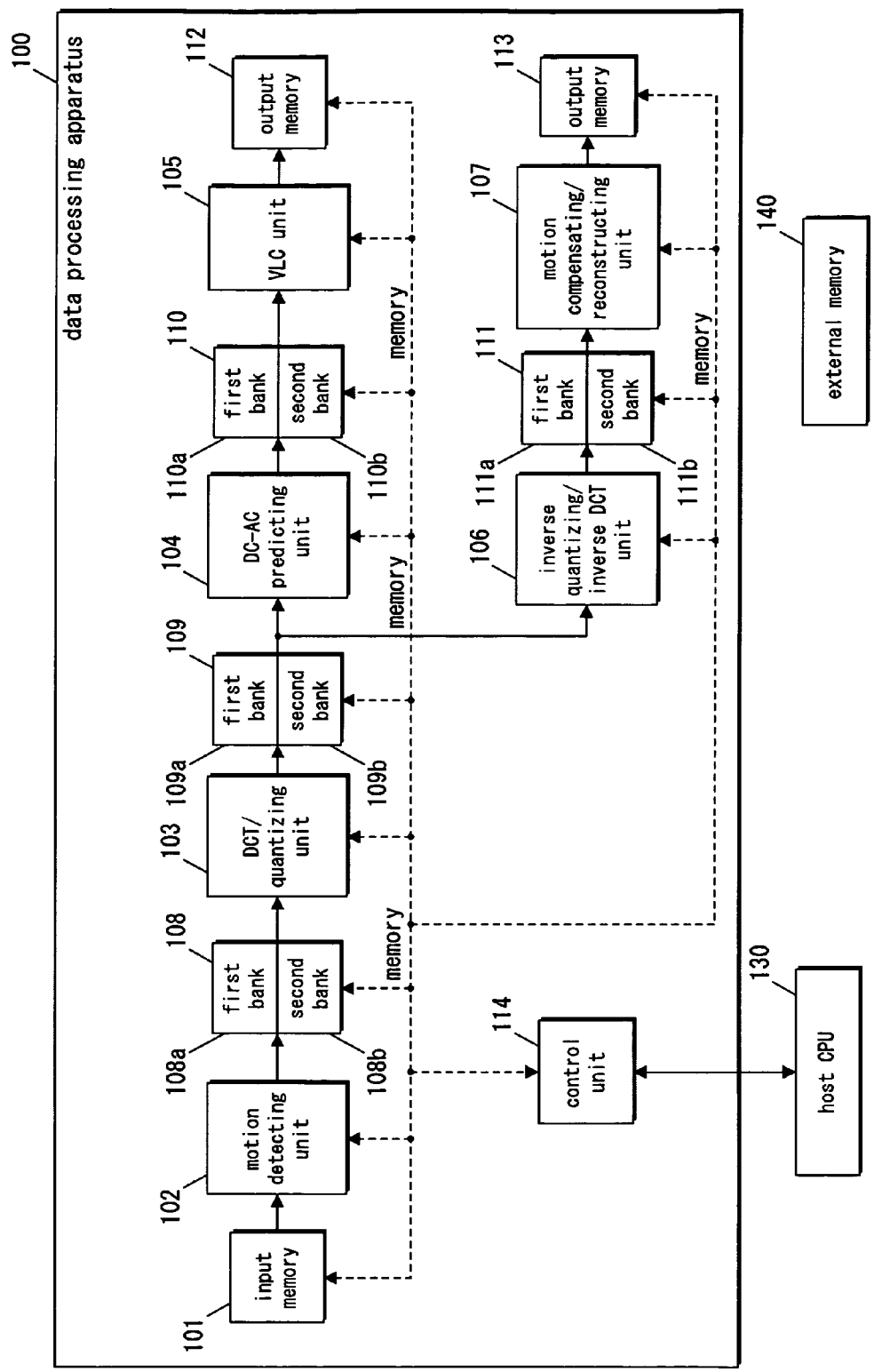
FIG. 8 is a block diagram illustrating a data processing apparatus according to Embodiment 2 of the present invention.
Figure 11:
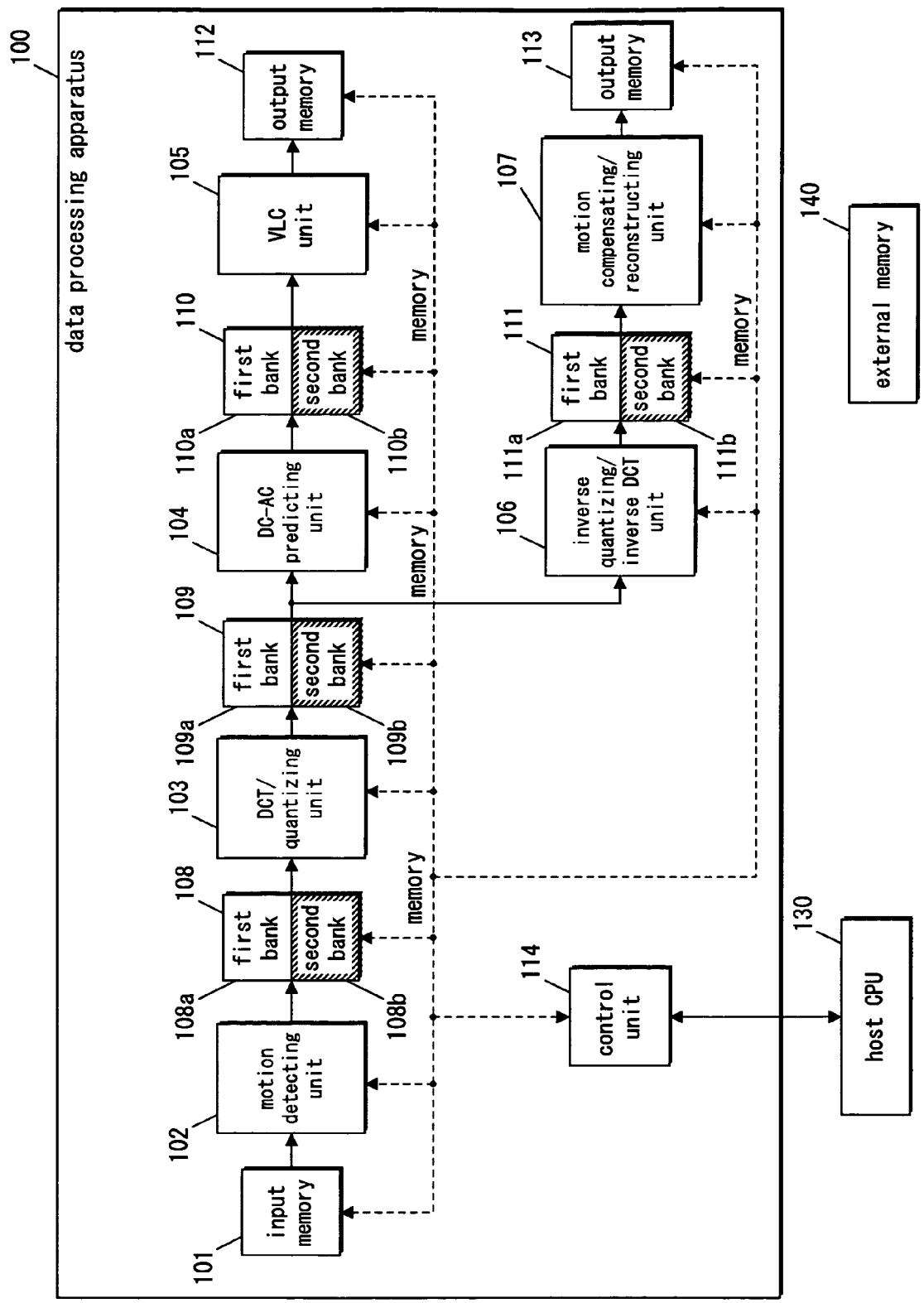
FIG. 11 is a block diagram illustrating the data processing apparatus according to Embodiment 2 of the present invention.

FIG. 8 and FIG. 11 are block diagrams of a data processing apparatus in Embodiment 2 of the present invention.

In FIG. 8, the data processing apparatus 100 performs motion picture compression according to MPEG-4 which is one of the motion picture compressing/expanding standards.

The data processing apparatus 100 comprises an input memory 101, a motion detecting unit 102, a DCT/quantizing unit 103, a DC-AC predicting unit 104, a VLC unit 105, an inverse quantizing/inverse DCT unit 106, a motion compensating/reconstructing unit 107, memories 108 to 111, output memories 112 and 113, and a control unit 114. The motion detecting unit 102, the DCT/quantizing unit 103, the DC-AC predicting unit 104, the VLC unit 105, the inverse quantizing/inverse DCT unit 106, and the motion compensating/reconstructing unit 107 are calculating units that are included in the data processing apparatus 100. These calculating units perform pipeline processing.

Each of the memories 108, 109, 110, and 111 comprises a plurality of banks, and comprises a first bank and a second bank in the present example.

It is assumed that a data unit, which the data processing apparatus 100 treats, is a macro block unit including 16*16 pixels.

The input memory 101 stores encoding-target pixel data (pixel data to be encoded) and reference pixel data to be inputted to the motion detecting unit 102. The encoding-target pixel data and the reference pixel data are transmitted from an external memory 140 by a direct memory access (it is written as "DMA" hereafter).

The motion detecting unit 102 inputs the encoding-target pixel data and the reference pixel data from the input memory 101, and performs motion detecting processing. The motion detecting unit 102 outputs a calculation result or difference pixel data to the memory 108. When performing an intra-picture encoding, the motion detecting unit 102 outputs the encoding-target pixel data read from the input memory 101 to the memory 108, directly as it is.

The DCT/quantizing unit 103 reads the difference pixel data or the encoding-target pixel data from the memory 108. The DCT/quantizing unit 103 performs DCT calculation and quantization calculation using the read data, and outputs calculated coefficient data to the memory 109.

The DC-AC predicting unit 104 reads, from the memory 109, the coefficient data and the reference coefficient data of a DC component and AC components to be referred to in coefficient predicting processing. The DC-AC predicting unit 104 performs the coefficient predicting processing of the DC component and the AC components and rearrangement of the coefficient data, from a two-dimensional array to a one-dimensional array using a scanning method. Then, the DC-AC predicting unit 104 outputs, to the memory 110, the calculated one-dimensional-arrayed coefficient data, and the coefficient data of the DC component and the AC components to be referred to later in the coefficient predicting processing.

The VLC unit 105 reads the one-dimensional-arrayed coefficient data from the memory 110. The VLC unit 105 performs variable length encoding, and outputs the calculation result or the variable length encoded data to the output memory 112.

The inverse quantizing/inverse DCT unit 106 reads the quantized coefficient data from the memory 109. Using the read data, the inverse quantizing/inverse DCT unit 106 performs inverse quantizing calculation and DCT calculation, and outputs, to the memory 111, the calculation result as the decoded difference pixel data, or the encoding-target pixel data.

The motion compensating/reconstructing unit 107 reads, from the memory 111, a combination of the decoded difference pixel data and the reference pixel data to be used in the motion compensation processing or a combination of the encoding-target pixel data and the reference pixel data. When the combination of the decoded difference pixel data and the reference pixel data is read, the motion compensating/reconstructing unit 107 performs the motion compensation processing using the reference pixel data. Furthermore, the motion compensating/reconstructing unit 107 performs reconstruction calculation by adding the motion compensated reference pixel data and the difference pixel data, and outputs the reconstructed encoding-target pixel data to the output memory 113. When the combination of the encoding-target pixel data and the reference pixel data is read, the motion compensating/reconstructing unit 107 outputs the encoding-target pixel data to the output memory 113 as it is.

The memory 108 comprises two banks, a first bank 108a and a second bank 108b. One of the two banks stores the difference pixel data or the encoding-target pixel data, outputted from the motion detecting unit 102. The other bank outputs the stored difference pixel data or the stored encoding-target pixel data to the DCT/quantizing unit 103. Every time calculation is completed, the first bank 108a and the second bank 108b interchange the above-mentioned roles. In other words, in a unit cycle, when the first bank 108a stores the output data from the motion detecting unit 102 and the second bank 108b outputs the input data to the DCT/quantizing unit 103, and in the next cycle, the first bank 108a outputs, to the DCT/quantizing unit 103, the data stored in the previous cycle, and the second bank 108b stores the output data from the motion detecting unit 102.

The memory 109 comprises two banks, a first bank 109a and a second bank 109b.

One of the two banks stores the coefficient data outputted from the DCT/quantizing unit 103 and the reference coefficient data of the DC component and AC components inputted from the external memory 140 by the DMA. The other bank outputs the stored coefficient data and the reference coefficient data of the DC component and the AC components to the DC-AC predicting unit 104.

The memory 110 comprises two banks, a first bank 10a and a second bank 110b. One of the two banks stores the one-dimensional-arrayed coefficient data and the coefficient data of the DC component and the AC components to be referred to later in the coefficient predicting processing, both data being outputted from the DC-AC predicting unit 104. The other bank outputs the stored, one-dimensional-arrayed coefficient data to the VLC unit 105. The coefficient data of the DC component and the AC components to be referred to later by the coefficient predicting processing is transmitted to the external memory 140 using the DMA, from the bank storing the coefficient data thereof.

The memory 111 comprises two banks, a first bank 111a and a second bank 111b. One of the two banks stores the decoded difference pixel data or the encoding-target pixel data, outputted from the inverse quantizing/inverse DCT unit 106. Otherwise, inputting from the external memory 140, the bank stores the reference pixel data to be used in the motion compensation processing by the motion compensating/reconstructing unit 107. The other bank outputs a combination of the decoded difference pixel data and the reference pixel data or a combination of the encoding-target pixel data and the reference pixel data, to the motion compensating/reconstructing unit 107.

The output memory 112 stores the variable length encoded data outputted from the VLC unit 105. The stored variable length encoded data is outputted to the external memory 140 in order to generate a coded bit stream.

The output memory 113 stores the reconstructed encoding-target pixel data outputted from the motion compensating/reconstructing unit 107. The stored, reconstructed encoding-target pixel data is outputted to the external memory 140 as the reference pixel data to be used in motion detection for the next picture frame.

The control unit 114 determines a calculating unit that performs calculation in a unit cycle. Otherwise, the control unit 114 determines the number of the calculating units that perform calculation. In the present example, the calculating unit determines a calculation that perform calculation among the motion detecting unit 102, the DCT/quantizing unit 103, the DC-AC predicting unit 104, the VLC unit 105, the inverse quantizing/inverse DCT unit 106, and the motion compensating/reconstructing unit 107.

Moreover, the control unit 9 determines a bank that does not need to perform data update or data output, following the determination of the calculating unit that performs calculation.

In the picture processing performed by the data processing apparatus 100, a plurality of specifications or applications are selected. For example, it is assumed that the maximum capability of the data processing apparatus 100 is compression processing of pictures in size of VGA (640*480 pixels) at frame rate of 30 pieces per second, according to MPEG-4. It is also assumed that a first application requests the compression processing of pictures in VGA size at frame rate of 30 pieces per second. It is further assumed that a second application requests the compression processing of pictures in QVGA size (320*240 pixels) at frame rate of 30 pieces per second. It is yet further assumed that a third application requests the compression processing of pictures in QCIF size (176*144 pixels) at frame rate of 15 pieces per second.

Under the above described assumption, required speed for the data processing apparatus 100 is at the maximum in processing the first application. Assume that the required speed in processing the first application is a value "1"; then, the required speed in processing the second application is approximately ¼, and the required speed in processing the third application is approximately 1/24. Therefore, the permissible time for the entire processing of the second application or the third application is longer than that of the first application.

The difference in operation of the data processing apparatus 100 due to the difference in applications is explained using FIG. 9 to FIG. 12.

Figure 9:
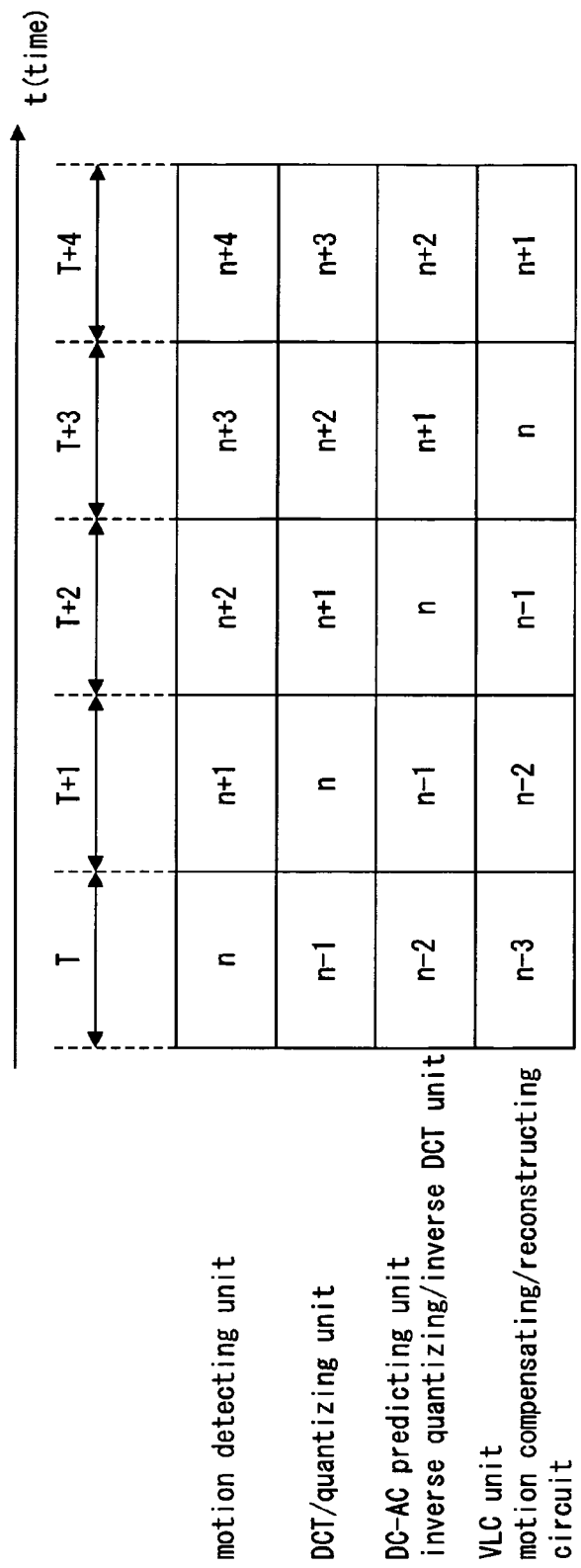
FIG. 9 is a diagram explaining processing of the data processing apparatus according to Embodiment 2 of the present invention.
Figure 10:
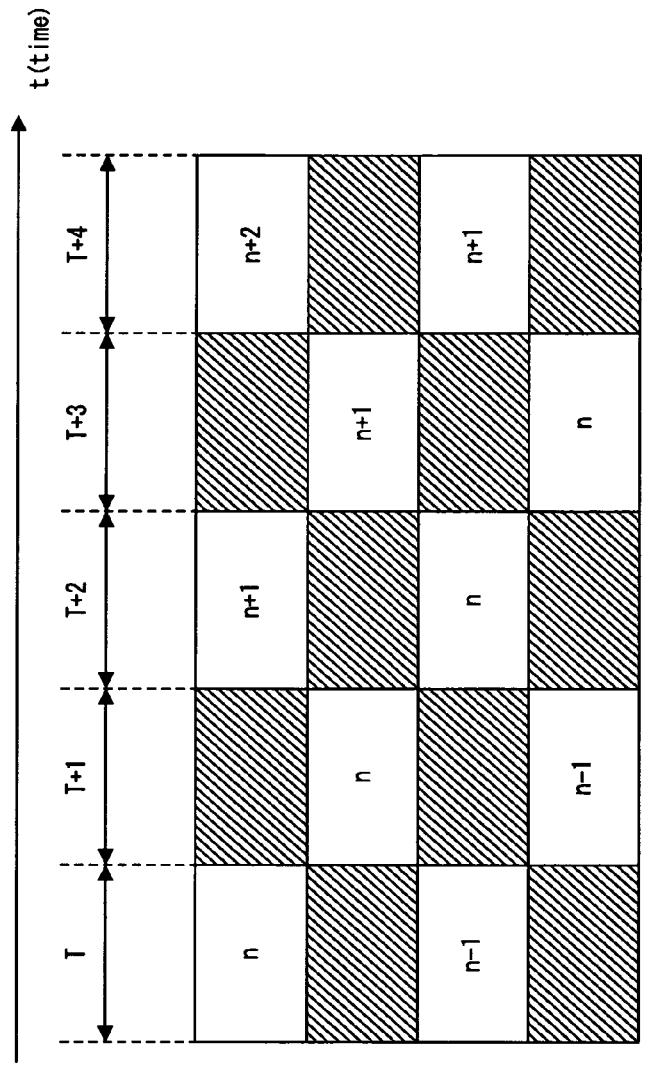
FIG. 10 is a diagram explaining processing of the data processing apparatus according to Embodiment 2 of the present invention.
Figure 12:
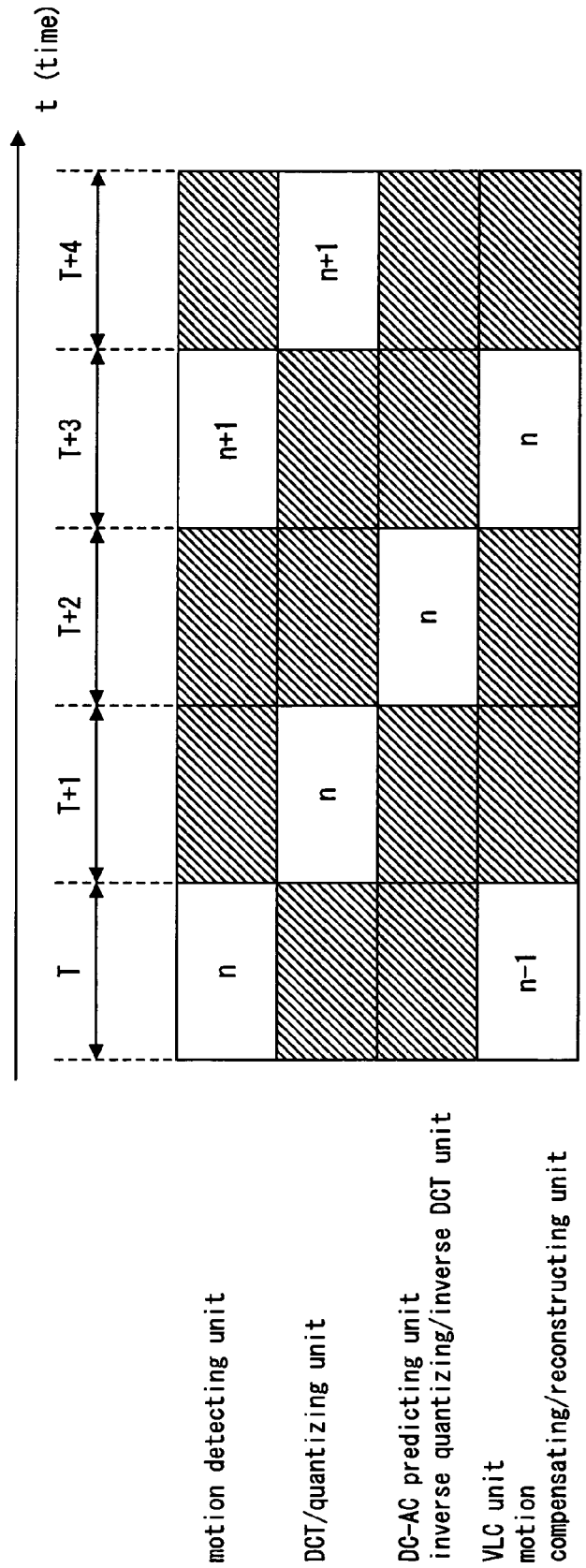
FIG. 12 is a diagram explaining processing of the data processing apparatus according to Embodiment 2 of the present invention.

FIG. 9, FIG. 10, and FIG. 12 are diagrams explaining processing of the data processing apparatus in Embodiment 2 of the present invention.

FIG. 9 shows operation of the data processing apparatus 100 in processing the first application which requires the maximum speed of the data processing apparatus 100.

Unit cycles "T" to "T+4" are shown in the horizontal direction. Calculating units, which are connected in series, are shown in the vertical direction. Numbers "n−3" to "n+4" in the matrix indicate the numbers of macro blocks to be processed. Each calculating unit performs calculation in a macro block unit. For example, in the unit cycle "T", the motion detecting unit 102 performs the motion detection to the n-th macro block.

In addition, the unit cycle is defined based on the maximum processing time among the processing times of the calculating units included in the data processing apparatus 100.

As shown in FIG. 9, in processing the first application, all of the calculating units from the motion detecting unit 102 to the motion compensating/reconstructing unit 107 perform their own calculation in the same unit cycle. Moreover, all of the memories 108 to 111 are in operation.

Since the required speed is at the maximum, the control unit 114 determines all calculating units as calculating units that perform calculation in the unit cycle. In processing the first application, the processing time is the shortest, and the power consumption is the maximum.

In the present example, the average processing time of the macro block processed by the data processing apparatus 100 is defined as time "S" for the first application.

It is assumed that the permissible processing time for processing the second application is time "2.2S". A host CPU 130 notifies the control unit 114 of information regarding the permissible processing time.

In processing the second application, the control unit 114 determines a calculating unit that performs calculation so as to process input data every 2 unit cycles. The situation in the present processing is shown in FIG. 10.

In FIG. 10, the calculating units corresponding to the shaded areas in the matrix are the calculating units that do not perform calculation. For example, in the unit cycle "T", the motion detecting unit 102, the DC-AC predicting unit 104, and the inverse quantizing/inverse DCT unit 106 perform calculation, the rest of the calculating units do not perform calculation.

As clearly shown in FIG. 10, by the unit cycle "T+4", the motion detection up to the (n+2)th macro blocks is completed. In other words, the average processing time of one macro block is time "2S", and is within the permissible processing time "2.2S". Furthermore, by cutting the power supply, cutting the supply of the clock signal, reducing the frequency of the clock signal, or increasing the threshold voltage for the calculating units which do not need to perform calculation within a unit cycle, the power consumption can be reduced.

In other words, according to the permissible processing time which differs depending on applications, the control unit 114 determines a calculating unit that performs calculation.

As shown in FIG. 3, in the unit cycle 1, for example, the calculating unit 3 does not perform calculation, and the calculating unit 4 performs calculation. Either one of the first bank or the second bank included in the memory 7 in between the calculating unit 3 and the calculating unit 4 does not need to perform the data update from the calculating unit 3. More generally describing, the adjoining calculating units do not operate simultaneously, a first bank or a second bank of the memory located therebetween does not operate at the same time, with no need in data updating or data outputting.

In FIG. 11, banks that do not need to perform the data update or the data output in processing the second application are shown by shaded boxes with slanted lines therein. (The box is simply called as a shaded box hereafter.)

In the unit cycle "T" shown in FIG. 10, the DCT/quantizing unit 103, the VLC unit 105, and the motion compensating/reconstructing unit 107 do not perform calculation. Therefore, the second bank 108b, the second bank 109b, and the second bank 111b do not need to perform data update or data output.

To these banks, the control unit 114 cuts the power supply, cuts the supply of the clock signal, reduces the frequency of the clock signal, or increases the threshold voltage. As a result, it is possible to reduce the power consumption. The above reducing measures in the power consumption in memories adds further reduction effect to the reducing measures in the power consumption in the calculating units.

Next, a case of processing the third application is explained using FIG. 12.

In processing the third application, it is assumed that the permissible processing time is time "3.4S".

In the present case, the control unit 114 performs the processing by inputting the input data every 3 unit cycles. As clearly shown in FIG. 12, in the unit cycle "T+4", DCT/quantization calculation of the (n+1)th macro block is completed. The entire processing time is time "3S", and it is within the permissible processing time.

In FIG. 12, calculating units corresponding to the shaded boxes do not need to perform calculation. The control unit 114 determines these calculating units.

When there is a calculating unit which does not need to perform calculation, similar to the explanation in FIG. 11, there is a bank which does not need to perform data update or data output.

To the calculating unit that does not need to perform calculation or the bank that does not need to perform data update or data output, the control unit 9 cuts the power supply, cuts the supply of the clock signal, reduces the frequency of the clock signal, or increases the threshold voltage. As a result, without any adverse influence on the operation or the processing time, it is possible to reduce the power consumption.

For example, in the unit cycle "T" shown in FIG. 12, such as cutting the power supply or cutting the supply of the clock signal is exercised to the DCT/quantizing unit 103, the DC-AC predicting unit 104, and the inverse quantizing/inverse DCT unit 106.

It is preferable in controlling the power consumption reduction that the cut or supply of the power and/or the clock signal can be practiced separately and individually to each of the calculating units.

It is similarly preferable that the cut or supply of the power and/or the clock signal can be practiced separately and individually to each of the banks included in the memories.

As mentioned above, the control unit 114 determines a calculating unit which performs calculation in a unit cycle, according to the permissible processing time that differs depending on applications, and reduces the power consumption of the calculating unit that does not need to perform calculation and the bank that does not need to perform data update or data output. As a result, processing fulfilling specifications of each application is practiced and, at the same time, the power consumption of the data processing apparatus 100 is reduced.

In Embodiment 2, a case where the data processing apparatus 100 processes pictures in macro block unit is explained, the data processing apparatus 100 may process pictures in block unit or in slice unit. Moreover, the calculating units included in the data processing apparatus 100 are not limited to these shown in FIG. 8.

Moreover, the processing performed by the data processing apparatus 100 may be the picture processing according to other standards than the MPEG-4, such as picture processing according to MPEG-2 and JPEG, or audio processing.

In addition, the construction of the calculating units which perform pipeline processing is not limited to the construction composed of from the motion detecting circuit 102 to the motion compensating/reconstructing circuit 107. For example, alternative construction may include the motion detecting unit 102 divided into two unit cycles, the DCT/quantizing processing unit 103 divided into two calculating units performing separately the DCT calculation and the quantization calculation.

Furthermore, each of the memories 108 to 111 may be constructed by physically different two banks, or by a memory cell possessing one dual port.

The control unit 114, or alternatively, the host CPU 130, may control the plurality of the calculating units included in the data processing apparatus 100.

When the data processing apparatus 100 is mounted in a semiconductor integrated circuit, the power consumption of the semiconductor integrated circuit can be reduced. Especially, peak power or power at a moment in the semiconductor integrated circuit can be reduced.

Embodiment 3

Figure 13:
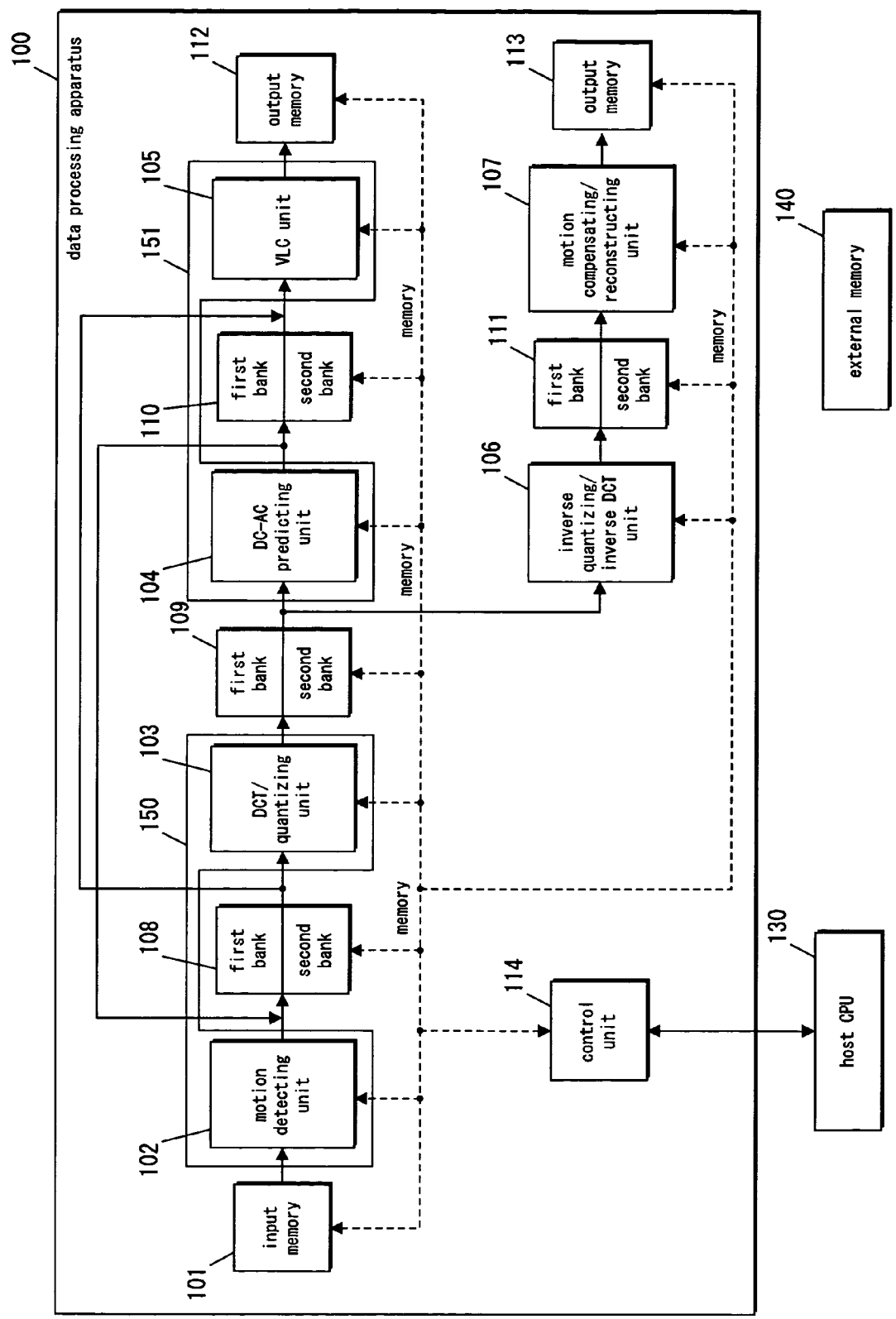
FIG. 13 is a block diagram illustrating a data processing apparatus according to Embodiment 3 of the present invention.
Figure 14:
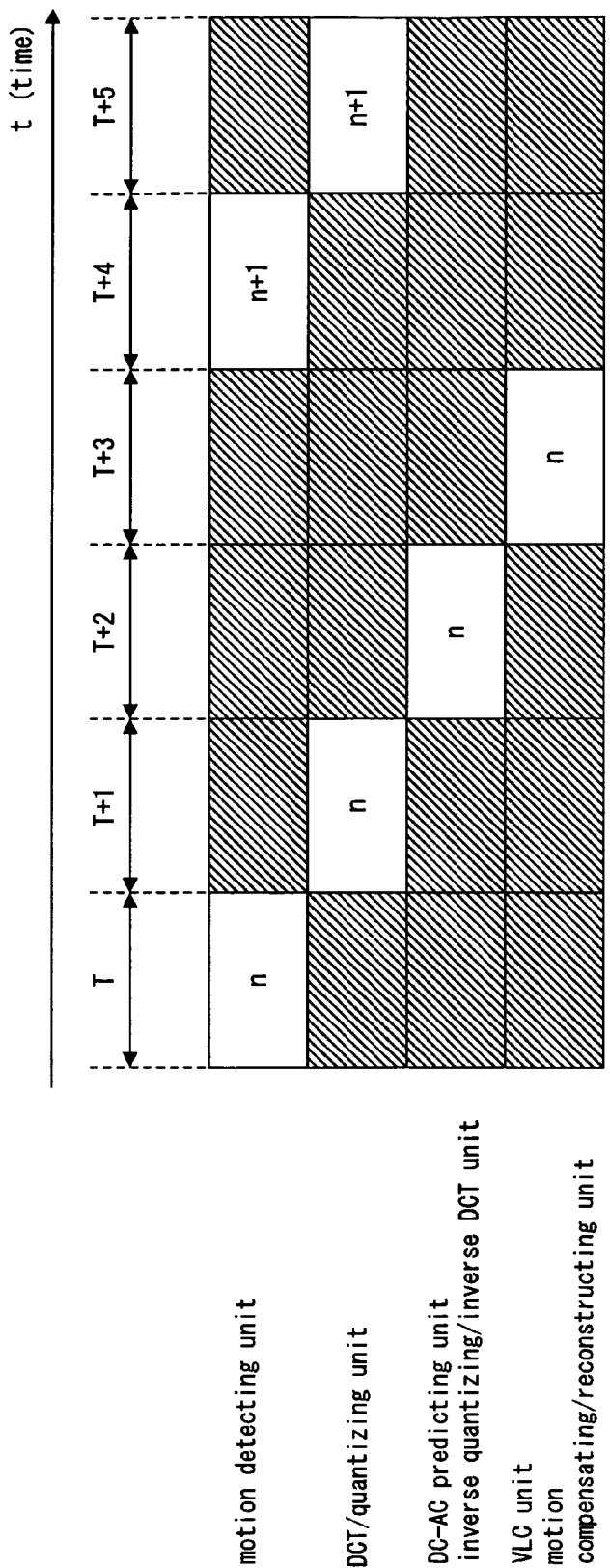
FIG. 14 is a diagram explaining operation of the data processing apparatus according to Embodiment 3 of the present invention.

Next, Embodiment 3 is explained using FIG. 13 and FIG. 14.

In Embodiment 3, a data processing apparatus reduces the power consumption by sharing a memory or memories when a smaller number of calculating units perform calculation out of a plurality of calculating units.

FIG. 13 is a block diagram of a data processing apparatus in Embodiment 3 of the present invention. FIG. 14 is a diagram explaining operation of the data processing apparatus in Embodiment 3 of the present invention.

In FIG. 13, it is assumed that the memory 108 is a first memory, and the memory 110 is a second memory.

The first memory 108 is connected to a calculating unit at a previous stage and another calculating unit at a following stage. The calculating units at the previous and following stages constitute a first calculating-unit pair. In FIG. 13, the motion detecting unit 102 and the DCT/quantizing unit 103 constitute the first calculating-unit pair 150.

The second memory 110 is connected to the DC-AC predicting unit 104 at the previous stage and to the VLC unit 105 at the following stage. The DC-AC predicting unit 104 and the VLC unit 105 constitute a second calculating-unit pair 151.

Here, depending on the required speed in processing an application, the first calculating-unit pair 150 and the second calculating-unit pair 151 operate exclusively in a certain same unit cycle. In other words, in the unit cycle, one of the first calculating-unit pair 150 and the second calculating-unit pair 151 performs calculation, and the other one does not perform calculation.

In such a case, the first calculating-unit pair 150 and the second calculating unit pair 151 can share either the first memory 108 or the second memory 110. For example, the output of the DC-AC predicting unit 104 is fed not only to the second memory 110 but also to the first memory 108. The output of the first memory 108 is fed not only to the DCT/quantizing unit 103 but also to the VLC unit 105.

In other words, the first memory 108 functions to store the data outputted from the motion detecting unit 102 and to output the stored data to the DCT/quantizing unit 103, in addition, the first memory 108 further comprises a data input bus from the DC-AC predicting unit 104 and an output bus to the VLC unit 105. The first memory 108 stores the data outputted from the DC-AC predicting unit 104, and outputs the stored data to the VLC unit 105.

In this case, the first calculating-unit pair 150 and the second calculating-unit pair 151 do not use the second memory 110 but share the first memory 108. The first calculating-unit pair 150 and the second calculating-unit pair 151 operate exclusively in the same unit cycle. Thus, in a unit cycle in which the first calculating-unit pair 150 operates, the first calculating-unit pair 150 uses the first memory 108, and in another unit cycle in which the second calculating-unit pair 151 operates, the second calculating-unit pair 151 uses the first memory 108.

As a result, since the second memory 110 is not used, the power supply and the supply of the clock signal thereto can be cut down. In other words, it is possible to reduce the power consumption in the second memory 110.

Figure 15:
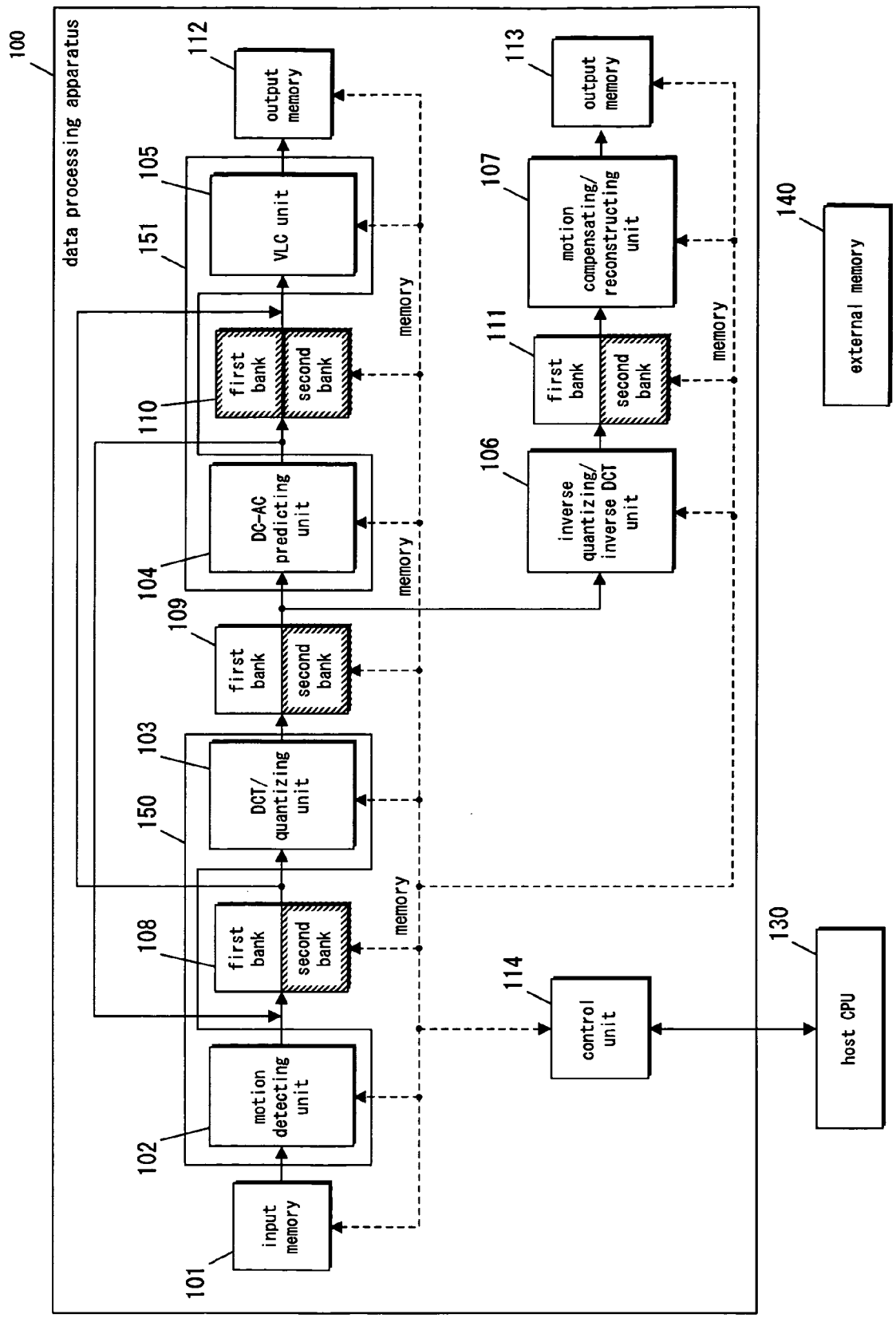
FIG. 15 is a block diagram illustrating the data processing apparatus according to Embodiment 3 of the present invention.

Next, the following explains a case where the permissible processing time for the entire processing is time "4.2S", using FIG. 14 and FIG. 15. FIG. 15 is a block diagram of a data processing apparatus in Embodiment 3 of the present invention.

The control unit 114 feeds the input data to the motion detecting unit 102 every 4 unit cycles. In other words, in the unit cycle "T", the motion detecting unit 102 processes the n-th macro block. In the unit cycle "T+4", the motion detecting unit 102 processes the (n+1)th macro block. As shown in FIG. 14, in a same unit cycle, two calculating units at most perform calculation, and the rest of the calculating units do not perform calculation.

In FIG. 14, in the unit cycle "T", the motion detecting unit 102 processes the n-th macro block, but the other calculating units corresponding to the shaded areas in the matrix do not perform the calculation.

In the unit cycle "T+1", the DCT/quantizing unit 103 processes the n-th macro block, and the other calculating units do not perform calculation.

In the unit cycle "T+2", the DC-AC predicting unit 104 and the inverse quantizing/inverse DCT unit 106 process the n-th macro block, and the other calculating units do not perform calculation.

In the unit cycle "T+3", the VLC unit 105 and the motion compensating/reconstructing unit 107 process the n-th macro block, and the other calculating units do not perform the calculation.

In the unit cycle "T+4", the data of a new (n+1)th macro block is inputted into the motion detecting unit 102.

As mentioned above, processing of the n-th macro block is completed in 4 unit cycles. Thus, it satisfies the permissible processing time "4.2S".

As shown in FIG. 14, the calculating units corresponding to the shaded areas in the matrix do not perform calculation.

To the calculating units which do not perform calculation, the control unit 114 cuts the power supply or the supply of the clock signal. As a result, it is possible to reduce the power consumption in calculating units that do not perform calculation. The control unit 114 may reduce the frequency of the clock signal and/or increase the threshold voltage to the calculating unit that does not need to perform calculation.

Furthermore, the first calculating-unit pair 150 which consists of the motion detecting unit 102 and the DCT/quantizing unit 103, and the second calculating-unit pair 151 which consists of the DC-AC predicting unit 104 and the VLC unit 105 operate exclusively in a unit cycle. Thus, the first calculating-unit pair 150 and the second calculating-unit pair 151 can share the first memory 108.

As shown in FIG. 14, in the unit cycle "T" and the unit cycle "T+1", only the motion detecting unit 102 and the DCT/quantizing unit 103 of the first calculating-unit pair 150 performs calculation. Thus, in the unit cycle "T" and the unit cycle "T+1", the first calculating-unit pair 150 uses the first memory 108.

On the other hand, in the unit cycle "T+2" and the unit cycle "T+3", as shown in FIG. 14, the DC-AC predicting unit 104 and the VLC unit 105 of the second calculating-unit pair 151 perform calculation. The first calculating-unit pair 150 does not perform calculation. Thus, in the unit cycle "T+2" and "T+3", the second calculating-unit pair 151 uses the first memory 108. In addition, the second memory 110 is not used in either of the unit cycles. In other words, the second memory 110 is not used in all unit cycles.

To the second memory 110, the control unit 114 cuts the power supply or stops the supply of the clock signal. Alternatively, the control unit 114 reduces the frequency of the clock signal and/or increases the threshold voltage to the second memory 110. As a result, it is possible to reduce the power consumption in the second memory 110. In particular, since the second memory 110 is not used in all of the unit cycles, the effect on the reduction of the power consumption is large.

Moreover, as shown in FIG. 15, it is possible to reduce the power consumption in the shaded banks.

As mentioned above, by sharing the bank, it is possible to further reduce the power consumption. In addition, according to the permissible processing time for which the application requires, the control unit determines a calculating unit that performs calculation for every unit cycle. Thus, the data processing within the permissible processing time can be realized.

When the permissible processing time becomes longer, the number of the shared memories increases, so that the power consumption can be further reduced.

In the present embodiment, the case of sharing the first memory 108 on condition that the memory 108 is the first memory is explained. However, the construction of the data processing apparatus 100 is not limited to the present construction. Shared memories may be determined according to the number of pipeline stages and connection format of the calculating units that constitute the data processing apparatus 100.

When the data processing apparatus 100 is mounted in a semiconductor integrated circuit, the power consumption of the semiconductor integrated circuit can be reduced.

In Embodiment 3, a case where the data processing apparatus 100 processes pictures in macro block unit is explained, the data processing apparatus 100 may process pictures in block unit or in slice unit. Moreover, the calculating units included in the data processing apparatus 100 are not limited to these shown in FIG. 15.

Moreover, the processing performed by the data processing apparatus 100 may be the picture processing according to other standards than the MPEG-4, such as picture processing according to MPEG-2 and JPEG, or audio processing.

In addition, the construction of the calculating units which perform pipeline processing is not limited to the construction composed of from the motion detecting circuit 102 to the motion compensating/reconstructing circuit 107. For example, alternative construction may include the motion detecting unit 102 divided into two unit cycles, the DCT/quantizing processing unit 103 divided into two calculating units performing separately the DCT calculation and the quantization calculation.

Furthermore, each of the memories 108 to 111 may be constructed by physically different two banks, or by a memory cell possessing one dual port.

The control unit 114, or alternatively, the host CPU 130, may control the plurality of the calculating units included in the data processing apparatus 100.

Embodiment 4

Next, Embodiment 4 is explained. In Embodiment 4, the data processing apparatus 100 is mounted in a semiconductor integrated circuit.

Figure 16:
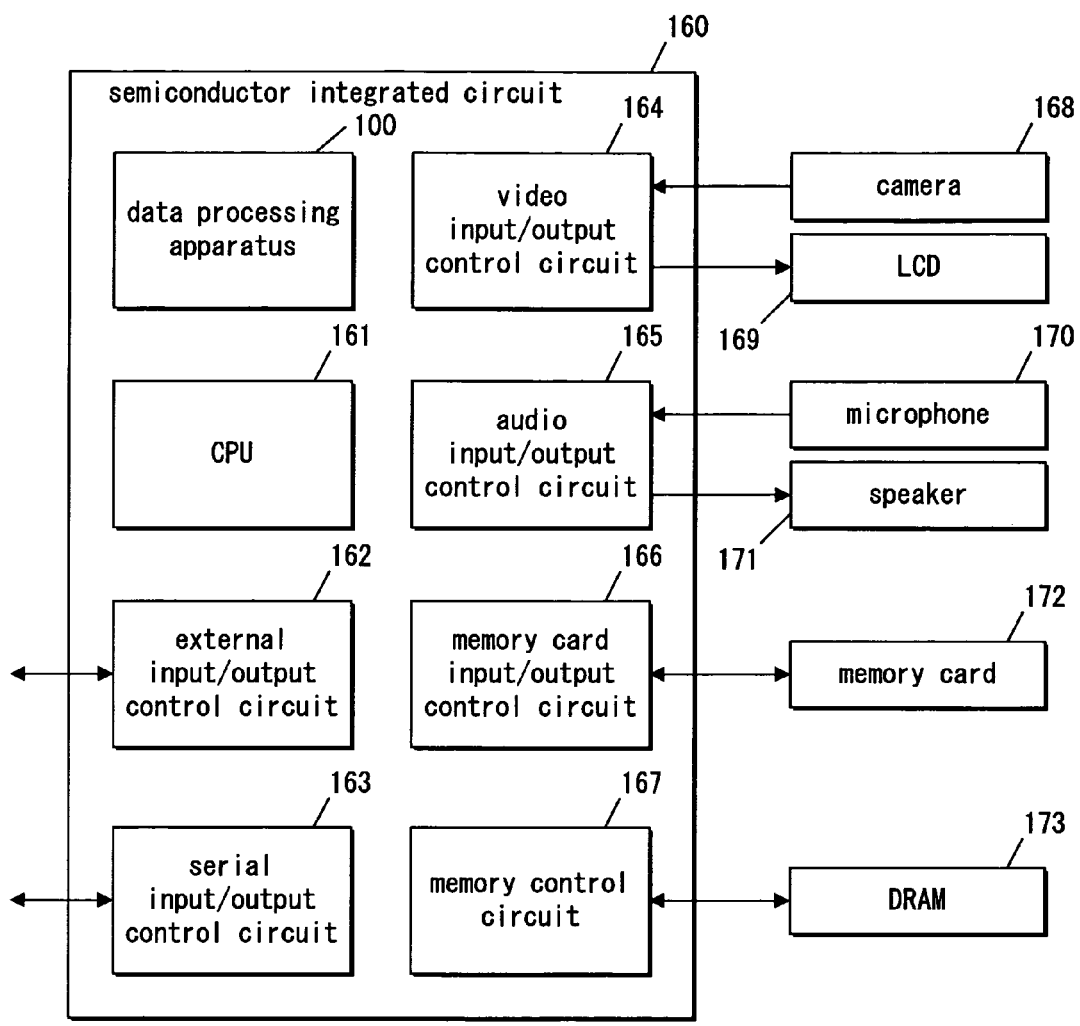
FIG. 16 is a block diagram illustrating a semiconductor integrated circuit according to Embodiment 3 of the present invention.
Figure 17:
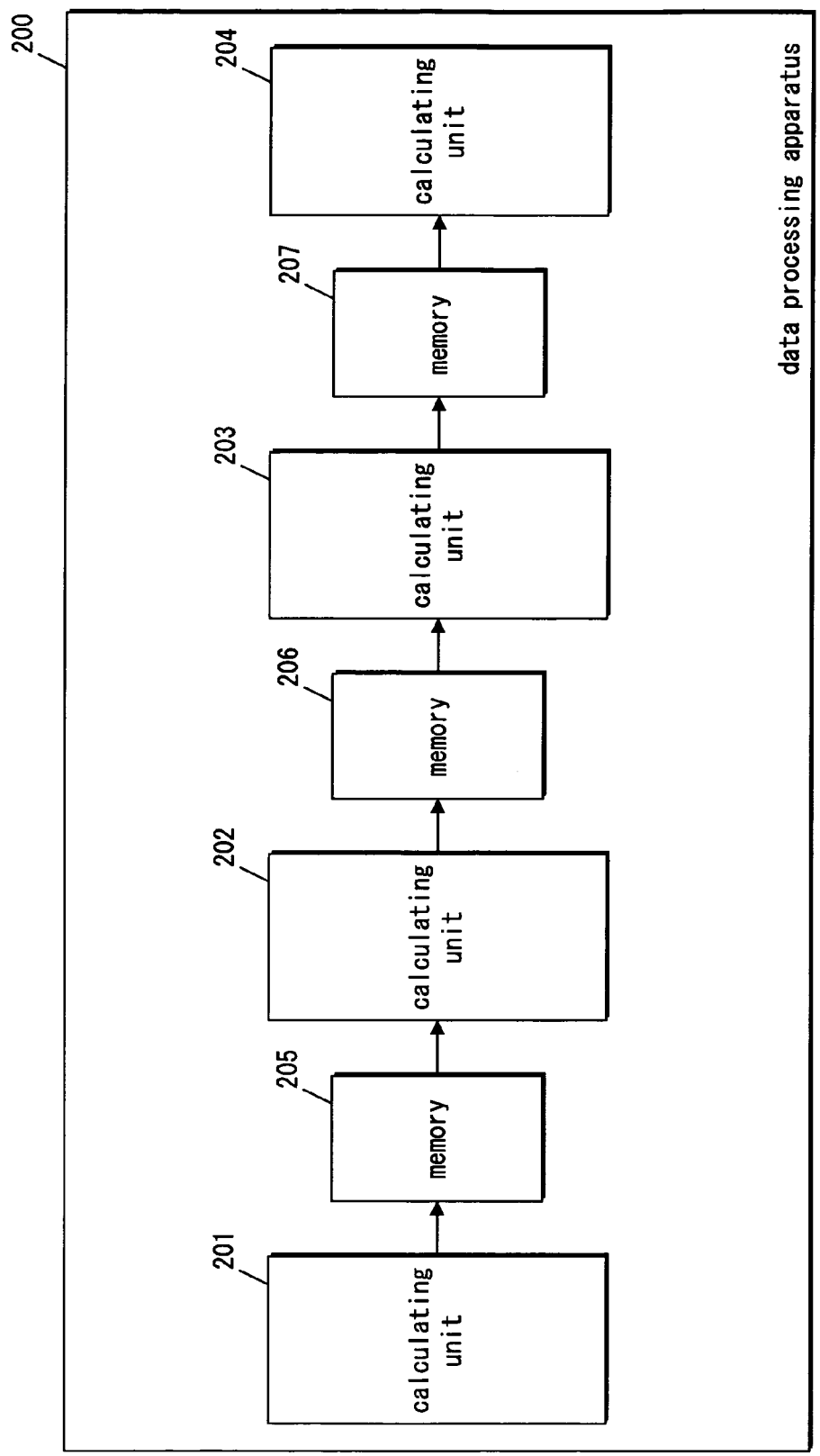
FIG. 17 is a block diagram illustrating a data processing apparatus disclosed in Document 1.

FIG. 16 is a block diagram of a semiconductor integrated circuit in Embodiment 3 of the present invention. A semiconductor integrated circuit 160 is realized by ICs or an LSI.

In FIG. 16, the semiconductor integrated circuit 160 is mounted in a single LSI, however, the semiconductor integrated circuit 160 may be mounted in a plurality of LSIs. Moreover, the semiconductor integrated circuit 160 may be sealed with a package if needed, and mounted in an electronic board. The electronic board is housed in a case if needed. Furthermore, necessary electronic parts or devices may be connected to the exterior of the semiconductor integrated circuit 160, thereby constituting an electronic device, such as a video camera, a notebook-sized personal computer and a mobile terminal.

The semiconductor integrated circuit 160 comprises, in addition to the data processing apparatus 100 explained in Embodiments 2 and 3, a CPU 161, an external input/output control circuit 162, a serial input/output control circuit 163, a video input/output control circuit 164, an audio input/output control circuit 165, a memory card input/output control circuit 166, and a memory control circuit 167.

The video input/output control circuit 164 is externally connected to a camera 168 and an LCD 169. The audio input/output control circuit 165 is connected to a microphone 170 and a speaker 171. The memory card input/output control circuit 166 is connected to a memory card 172. The memory control circuit 167 is connected to a DRAM 173. These control circuits included in the semiconductor integrated circuit 160 control the devices that are connected in the exterior thereof.

The data processing apparatus 100 possesses the construction and function that are explained in Embodiments 2 and 3. In other words, the data processing apparatus 100 comprises a plurality of calculating units, connected each other in series, each of which performs the predetermined calculation within a unit cycle, and a plurality of memories, which are connected in between the plurality of calculating units, and control units.

The control unit determines a calculating unit that performs calculation in the unit cycle among the plurality of calculating units.

More specifically, the control unit determines a calculating unit that performs calculation among the plurality of calculating units, according to such as permissible processing time in the data processing apparatus 100 and the input interval of input data. In some applications, there is a memory not used in a unit cycle due to sharing, or there is a bank not used in a unit cycle when a memory comprises a plurality of banks.

The control unit cuts the power supply or the supply of the clock signal to these calculating units, memories, and banks that do not need to perform operation. Alternatively, the control unit reduces the frequency of the clock signal to these calculating units, a memory, etc., and/or increases the threshold voltage of these calculating units, memories, etc.

By the above-mentioned control by the control unit, it is possible to reduce the unnecessary power consumption and realize the processing satisfying the permissible processing time set dependently on the different applications.

According to the semiconductor integrated circuit of the present invention, it is possible to reduce the power consumption while fulfilling the required speed of the applications.

According to the present invention, while satisfying the permissible processing time set dependently on the application, the data processing apparatus operable to reduce the unnecessary power consumption can be realized.

It is also possible to reduce the unnecessary power consumption in memories and banks included in the memories that do not need to perform data updating or data outputting, in addition to the calculating units that do not need to perform calculation.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A data processing apparatus comprising:
 a plurality of calculating units connected to each other in series, each of said plurality of calculating units being configured to perform an individually allotted calculation in a unit cycle, the unit cycle including a predetermined time period;
 a plurality of memory units connected between said plurality of calculating units, in such a manner that each of said plurality of memory units and each of said plurality of calculating units are connected alternately; and
 a control unit configured to select a calculating unit to perform the individually allotted calculation in a certain unit cycle, among said plurality of calculating units,
 wherein said control unit selects a calculating unit to perform the individually allotted calculation in a certain unit cycle among said plurality of calculating units according to notified permissible time information on regarding a total processing time required for each of said plurality of calculating units to perform the individually allotted calculation, and wherein said control unit sets an input interval of data inputted to a first stage calculating unit of said plurality of calculating units according to the permissible time information, then selects a calculating unit to perform the individually allotted calculation in a certain unit cycle, among said plurality of calculating units according to the set input interval.

2. A semiconductor integrated circuit comprising:

a plurality of calculating units connected to each other in series, each of said plurality of calculating units being configured to perform an individually allotted calculation in a unit cycle, the unit cycle including a predetermined time period;

a plurality of memory units connected between said plurality of calculating units, in such a manner that each of said plurality of memory units and each of said plurality of calculating units are connected alternately; and a control unit configured to select a calculating unit to perform the individually allotted calculation in a certain unit cycle, among said plurality of calculating units, wherein said control unit selects a calculating unit to perform the individually allotted calculation in a certan unit cycle, among said plurality of calculating units, according to notified permissible time information regarding a total processing time required for each of said plurality of calculating units to perform the individually allotted calculation, and wherein said control unit sets an input interval of data inputted to a first stage calculating unit of said plurality of calculating units according to the permissible time information, then selects a calculating unit to perform the individually allotted calculation in a certain unit cycle, among said plurality of calculating units according to the set input interval.

* * * * *